US005753897A

United States Patent [19]

Kasper

[11] Patent Number: 5,753,897

[45] Date of Patent: May 19, 1998

[54] APPARATUS FOR DISPENSING CARDS HAVING AN INTEGRATED CIRCUIT CHIP

[75] Inventor: Kazmier J. Kasper, Hopkinton, Mass.

[73] Assignee: Algonquin Industries, Inc., Bellingham, Mass.

[21] Appl. No.: 546,362

[22] Filed: Oct. 20, 1995

Related U.S. Application Data

[63] Continuation-in-part of Ser. No. 526,501, Sep. 11, 1995, which is a continuation-in-part of Ser. No. 377,182, Jan. 24, 1995, Pat. No. 5,611,456.

[51] Int. Cl.[6] ........................ G06K 5/00

[52] U.S. Cl. ........................ 235/380; 235/381; 235/475; 235/492; 364/479.01; 221/270

[58] Field of Search ........................ 235/380, 381, 235/384, 475, 487, 492; 364/479.01; 221/270, 274, 281, 293, 303

[56] References Cited

U.S. PATENT DOCUMENTS

| | | | |
|---|---|---|---|
| 3,660,639 | 5/1972 | Cassel | 235/475 X |
| 3,874,652 | 4/1975 | Bilbrey | 235/475 X |
| 4,117,314 | 9/1978 | Schisselbauer et al. | 235/475 |
| 4,208,009 | 6/1980 | Markkanen et al. | 235/475 |
| 4,557,472 | 12/1985 | Hannon | 271/133 |
| 4,833,310 | 5/1989 | Shimamura et al. | 235/492 X |
| 4,877,947 | 10/1989 | Mori | 235/381 |
| 5,091,618 | 2/1992 | Takahashi | 235/492 X |
| 5,225,665 | 7/1993 | Zerfahs et al. | 235/487 X |
| 5,331,138 | 7/1994 | Saroya | 235/492 X |
| 5,332,890 | 7/1994 | Kitahara | 235/492 X |
| 5,335,822 | 8/1994 | Kasper | 221/259 |
| 5,336,877 | 8/1994 | Raab et al. | 235/492 X |

FOREIGN PATENT DOCUMENTS

| | | |
|---|---|---|
| 5556286 | 4/1980 | Japan . |
| 5210764 | 8/1993 | Japan . |

*Primary Examiner*—Donald T. Hajec
*Assistant Examiner*—Michael G. Lee
*Attorney, Agent, or Firm*—Kriegsman & Kriegsman

[57] ABSTRACT

A apparatus for dispensing articles such as tickets and cards includes a cabinet and a plurality of article dispensing assemblies inside the cabinet. Each article dispensing assembly includes a base and a frame for enclosing the articles to be dispensed in a stack. The bases are mounted on a pair of vertical support plates. A gate is disposed behind each frame for receiving articles from its associated frame and allowing only one article at a time to pass through. A toothed blade is disposed underneath each frame and a motor driven rack and pinion is coupled to the toothed blade for bringing the toothed blade into engagement with the lowermost article in the stack, moving said toothed blade so that the lowermost article is transported from the stack into the gate, bringing the toothed blade out of engagement with the article and then moving the toothed blade back to engage the next article in the stack. In one embodiment of the invention each frame is hingedly mounted on its base. In another embodiment of the invention each frame is hingedly and lockably mounted on its base and in still another embodiment of the invention, which is intended especially for use with cards which include an integrated circuit chip onto which information can be written into and read off of, each article dispensing assembly includes a read/write head assembly underneath its frame for reading information off of the chip on the card at the bottom of the stack and/or writing information onto the chip on the card at the bottom of the stack.

5 Claims, 25 Drawing Sheets

APPARATUS FOR DISPENSING CARDS HAVING AN INTEGRATED CIRCUIT CHIP

CROSS-REFERENCE TO RELATED APPLICATIONS

This application is a continuation-in-part of copending patent application Ser. No. 08/526,501 filed on Sep. 11, 1995, now pending, which in turn is a continuation-in-part of patent application Ser. No. 08/377,182 filed on Jan. 24, 1995, now U.S. Pat. No. 5,611,456.

BACKGROUND OF THE INVENTION

The present invention relates generally to an apparatus for dispensing articles and more particularly to an apparatus for dispensing articles such as tickets, cards and the like from a stack. The invention may be used for dispensing pull-tab type lottery tickets; however, it is to be understood that the invention is not exclusively limited to dispensing pull-tab type lottery tickets, but rather may be used with dispensing other types of tickets as well as other types of articles such as cards, including debit cards and telephone cards and the like from a stack.

In U.S. Pat. No. 3,790,161 to K. E. Ericsson there is disclosed an apparatus for feeding sheets, cards, banknotes and the like from a stack, the apparatus comprising a rotary roll which engages the lowermost sheet, card or banknote in the stack, a further roll spaced from and preferably slightly above the first roll, and a strip having a rough coating and so arranged between the two rolls as to extend inside a plane tangent to the peripheries of the rolls.

In U.S. Pat. No. 5,018,614 to W. D. K. Ruckert there is disclosed a ticket vending machine wherein an outer housing encloses an inner panel separating a money accepting and ticket dispensing apparatus. The money accepting apparatus releases an internal lever upon insertion of the correct money. This internal lever disengages from a toothed plate which is connected by a shaft to an external hand lever. A pulling of the external hand lever after insertion of the correct money turns multiple gears which cause a cam to actuate to release a ticket retaining gate. In addition, the gears are connected to a cylindrical rear roller which turns a pair of latex bands mounted around the rear roller and a front cylindrical roller mounted on an idler shaft. A weight over the tickets causes frictional pressure to be exerted on the ticket by turning bands and thereby allows the bands to move a single ticket under a raised exit gate.

In U.S. Pat. No. 4,704,518 to F. A. Brumm et al there is disclosed an apparatus for printing and issuing tickets which has a circular ticket guide in which a drive cylinder is disposed to selectively rotate in a forward or reverse direction. A ticket magazine feeds a blank ticket into the ticket guide in the forward direction and the cylinder rotates, driving the ticket in the forward or reverse direction in order to execute a series of process steps involved in issuing the written ticket. The tickets are stacked in the magazine obliquely on edge and retained in a pack configuration at the lower end of the magazine by a gravity actuated ticket retainer. Arrayed in an arcuate sequence adjacent the ticket guide in the forward direction are a printing and reading apparatus, a ramped impound aperture, and a ramped issue aperture. A ticket is fed from the hopper in the forward direction and the drive cylinder is rotated to carry the ticket past the printing and reading apparatus where information is written and verified on the ticket. The drive cylinder continues to rotate in the forward direction, carrying the ticket pass the impound, and then the issue aperture. The drive cylinder then reverses, first offering the ticket through the issue aperture and then, if the ticket is not manually removed from the aperture, the drive cylinder is rotated to feed the ticket into an impound enclosure through the impound aperture.

In U.S. Pat. No. 4,716,799 to D. Hartmann there is disclosed an automatic ticket dispensing machine and a method for operating it to automatically adjust itself to the size of tickets being dispensed. A strip of tickets is fed forward with an advancing mechanism past an optical sensor which detects the perforations between tickets. The optical sensor is coupled to a controller which controls the advancing mechanism. The controller determines the length of the ticket by monitoring the distance the tickets are advanced between detections of perforations. In response to a request for a ticket, the controller advances the ticket strip by a distance corresponding to the predetermined ticket length of output.

In U.S. Pat. No. 4,982,337 to Burr et al there is disclosed a system and method for distributing lottery tickets which includes a large number of remote, ticket-dispensing units which are connected intermittently, e.g., once each day or week to a central computer. The units record the number of tickets sold and transmit the sales data to the central computer, which in turn performs all the necessary accounting functions. Sales reports and invoice data may be sent by the central computer to each unit for printing, which avoids the need to mail the reports/invoices. The tickets are stored in fan-fold form and are burst, rather than cut, apart for dispensing. The tickets are dispensed at one end of the unit which faces the customer. A control panel for the vendor is located at the opposite end. Tickets of different length may be dispensed with an imprint of the vendor's name.

In U.S. Pat. No. 5,335,822 to K. J. Kasper, which patent is incorporated herein by reference, there is disclosed an apparatus for dispensing tickets from a stack. The apparatus includes a base. A frame for enclosing a stack of tickets is fixedly mounted on the base. A partition wall whose position can be changed to accommodate tickets of different sizes is removably mounted in the frame. A gate for receiving tickets and allowing only one ticket at a time to pass through is also fixedly mounted on the base. The gate includes a slider element which is adjusted to different heights by a screw having two different sized threads in order to accommodate tickets of different thickness. A toothed blade is disposed underneath the frame and a mechanism which includes a motor driven rack and pinion is coupled to the toothed blade for bringing the toothed blade into engagement with the lowermost ticket in the stack, moving said toothed blade so that the lowermost ticket is transported from the stack into the gate, bringing the toothed blade out of engagement with the ticket and then moving the toothed blade back to engage the next ticket in the stack. A removable weight is seated on top of the stack to push the stack down against the toothed blade. A ticket holder is provided to assist in loading tickets into the frame.

In U.S. Pat. No. 3,887,106 to P. M. Charlson etc. there is disclosed a cartridge for merchandise tickets or the like having a slot in its bottom at a ticket entrance end of the cartridge into which the tickets may be fed individually and having a slot in an opposite ticket discharge end and adjacent the bottom through which individual tickets may be fed out of the cartridge. The cartridge may be placed into a hopper having a feed roll movable upwardly so as to frictionally engage the lower most ticket in the cartridge for feeding the ticket out of the cartridge; and the cartridge may be placed into a stacker having feed rolls for moving a ticket through the slot in the bottom of the cartridge, with a feed roll being frictionally engageable with the ticket for moving it completely into the cartridge. A single switch is closed by the cartridge in the stacker so as to condition an associated machine for operation, and this switch is also actuated by a block on the top of a stack of tickets in the cartridge so as to open the switch when the cartridge is full for disabling the machine.

Other patents of interest include U.S. Pat. No. 2,078,984 to S. W. Williamson; U.S. Pat. No. 2,637,609 to P. Berg; and U.S. Pat. No. 5,176,237 to R. G. Yang.

It is an object of this invention to provide a new and improved apparatus for dispensing tickets, cards and the like.

It is another object of this invention to provide a new and improved apparatus for dispensing tickets, cards and the like from a stack.

SUMMARY OF THE INVENTION

An apparatus constructed according to this invention for dispensing articles such as tickets, cards and the like from a stack comprises a cabinet and an article dispensing module inside said cabinet, said article dispensing module comprising an article dispensing assembly, said article dispensing assembly including a base, a frame for enclosing a plurality of articles in a stack, one on top of the other, a gate behind the frame for receiving articles from the stack and allowing only one article at a time to pass through and a transport mechanism for transporting articles from said frame to said gate. The article dispensing module also includes a pair of vertical support plates for supporting the base.

According to one embodiment of the invention, the frame in the article dispensing assembly is hingedly mounted on the base so that the frame can be moved from a vertical position, where articles contained therein are dispensed, to a non-vertical position where articles can be loaded into it easily from the top. Also, a locking mechanism is provided for releasably locking the frame in its vertical position on the base.

According to one feature of the invention, a removable weight is provided for exerting downward pressure on the stack, the weight including a handle having side portions arranged so as to slide within a pair of grooves formed in the sidewalls of the frame when the weight is seated in the frame on top of the stack so as to restrict sidewise and back and forth movement of the weight within the frame.

According to another feature of the invention, exit rollers are provided to pull articles being dispensed from the gate.

According to still another feature of the invention, the article dispensing module is positioned within the cabinet facing to the rear so that the articles being dispensed exit therefrom inside the cabinet at the rear, and then drop down into an angled tray where they slide down forward to an opening in the front of the cabinet. This arrangement prevents damaging the exit mechanism by reaching in and pulling articles out from the exit rollers or tampering with the exit mechanism in an unauthorized way to extract articles.

According to yet still another feature of the invention, sensor assemblies are provided for the article dispensing assembly, one sensor assembly for sending out a signal used in counting articles dispensed, a pair of sensor assemblies for sending out signals for controlling movement of the transport mechanism, and a fourth sensor assembly for sending out a signal for indicating an empty condition in the frame. Each sensor assembly includes a flag and an optical sensor.

According to another embodiment of the invention, the article dispensing assembly includes a frame which is removably mounted on the base, the frame including an open top through which articles to be dispensed are loaded, a rear wall underneath which articles from the stack exit the frame, a cover for covering the top and extending over the rear wall, a gate for controlling exiting of articles from underneath the rear wall of the frame and a first locking mechanism for locking the cover in place over the top. The article dispensing assembly further includes a second locking mechanism for locking the frame in place on the base, the second locking mechanism also controlling the operation of the gate on the frame.

According to still another embodiment of the invention, wherein the articles to be dispensed are cards having an integrated circuit chip in which information may be read off of and/or written into, the apparatus includes a base, a frame, a gate, a transport mechanism and a read/write head assembly, the read/write head assembly being used to read information off of the chip on the card while it is in the frame and/or and write information onto the chip on the card while it is in the frame.

Various other features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENTS

Figure 1:
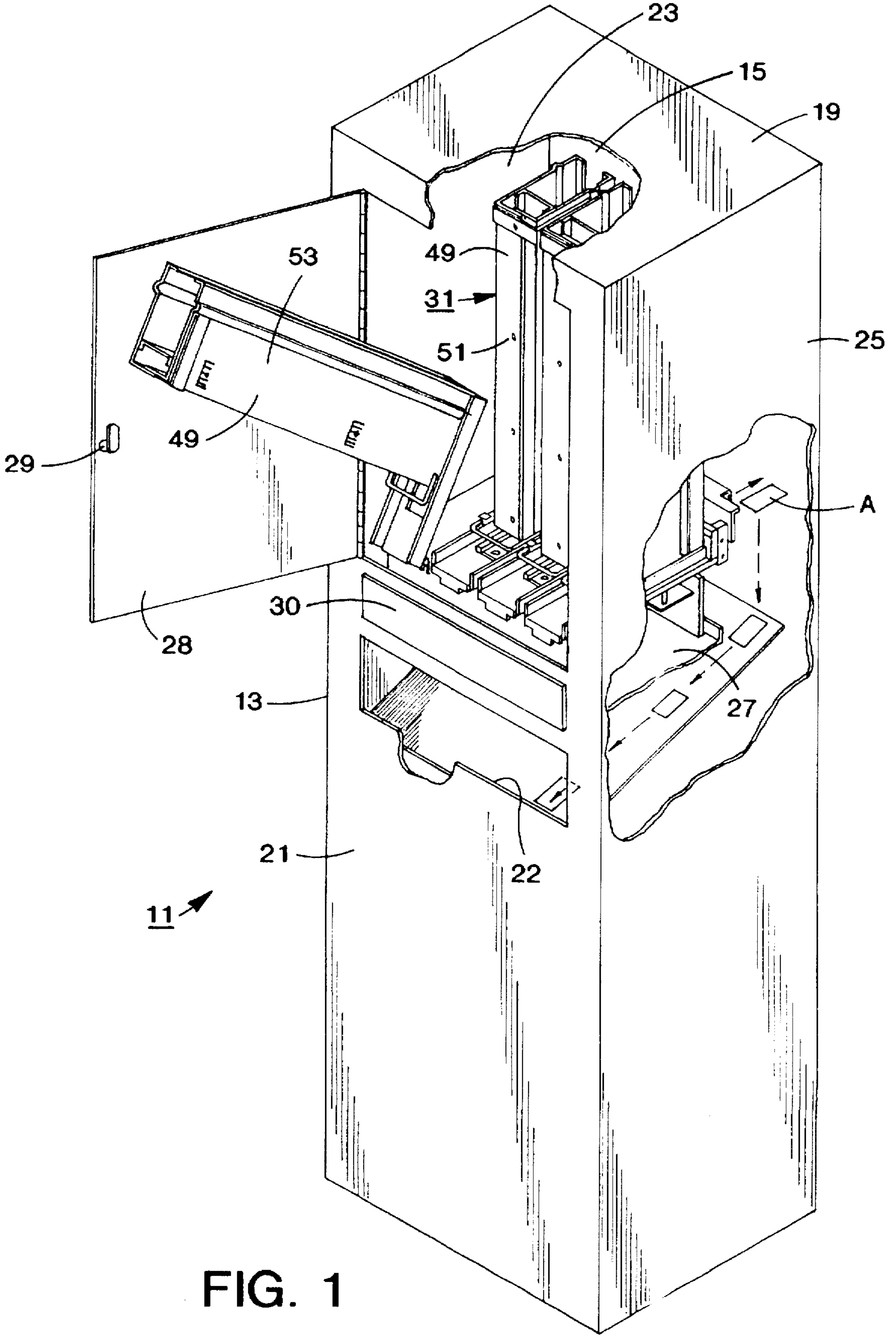
FIG. 1 is a perspective view partly broken away from the front of an apparatus constructed according to this invention for dispensing articles, with the door in the cabinet portion of the apparatus open and with one of the article dispensing assemblies in the article dispensing module inside the cabinet tilted forward for article loading purposes.
Figure 5:
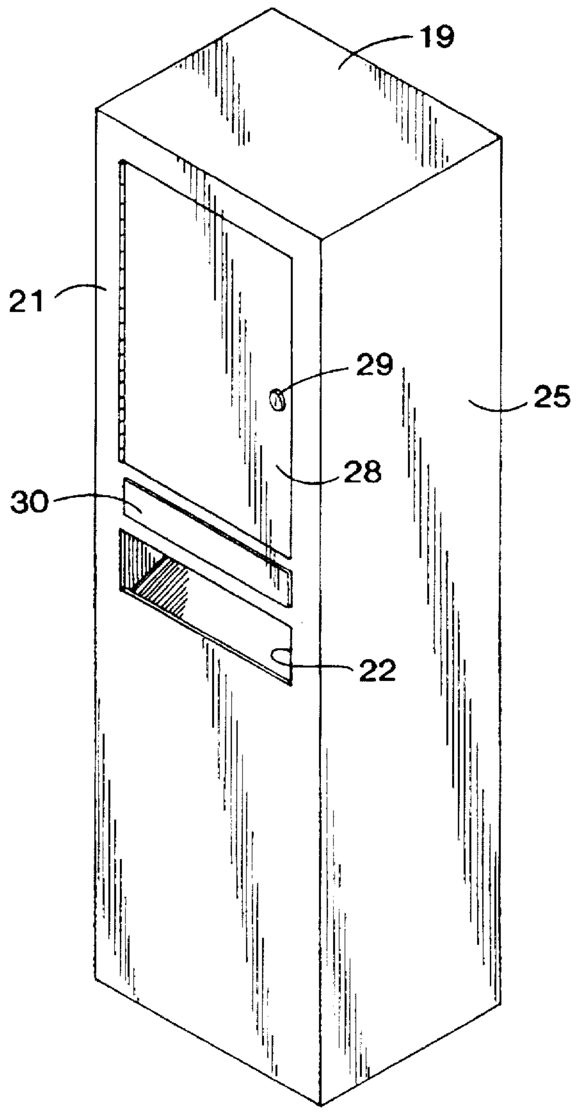
FIG. 5 is a perspective view taken from the front of the cabinet portion of the apparatus shown in FIG. 1, with the door closed.
Figure 2:
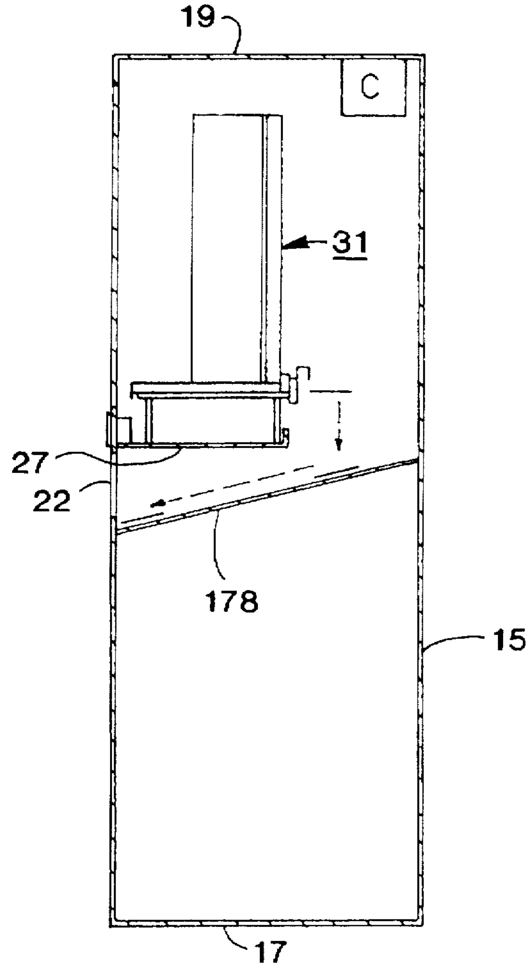
FIG. 2 is a side section view of the apparatus in FIG. 1, with the article dispensing module being shown in simplified form.
Figure 3:
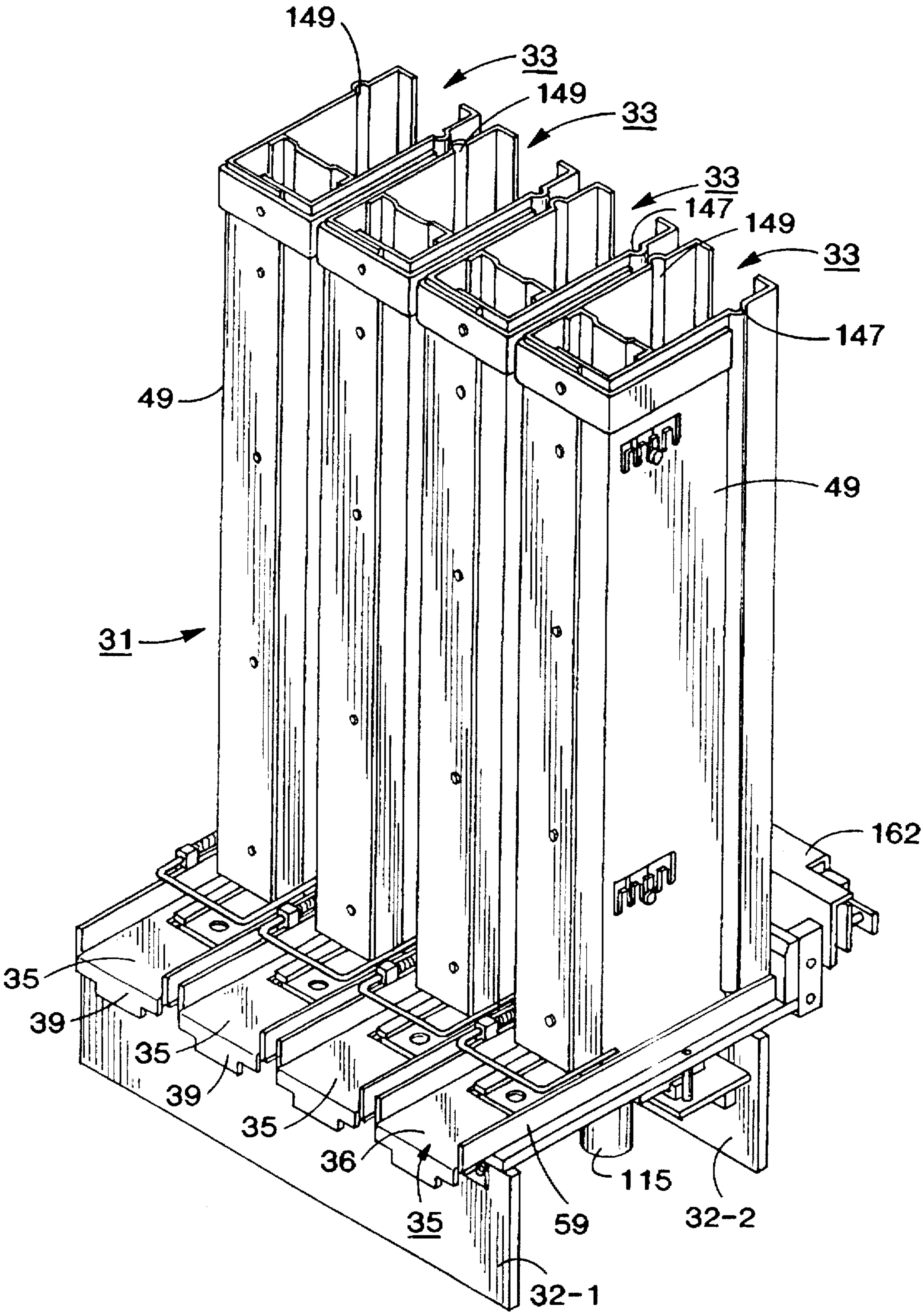
FIG. 3 is a perspective view taken from the front of the article dispensing module shown in FIG. 1.
Figure 4:
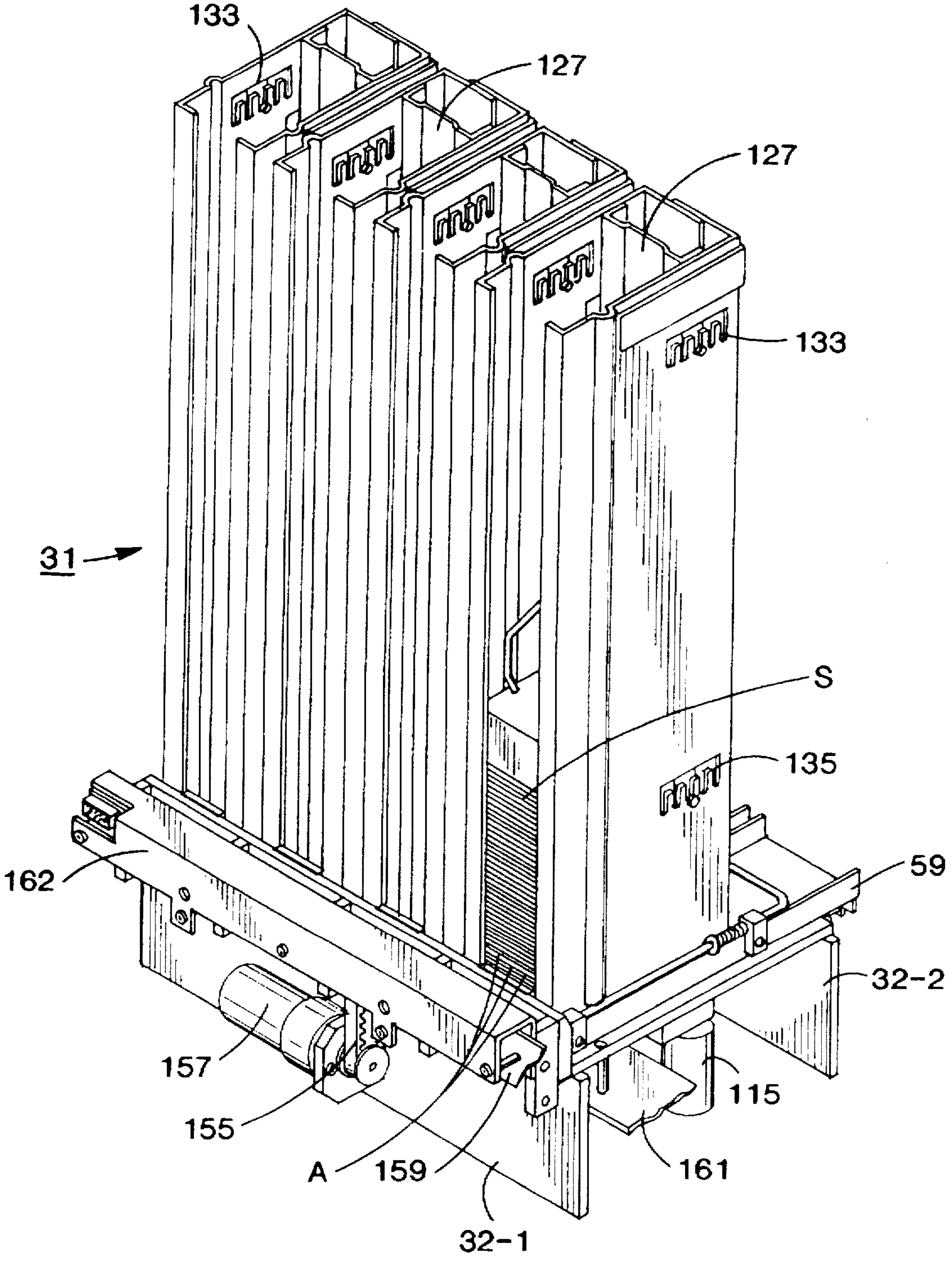
FIG. 4 is a perspective view taken from the front of the article dispensing module shown in FIG. 2.
Figure 6:
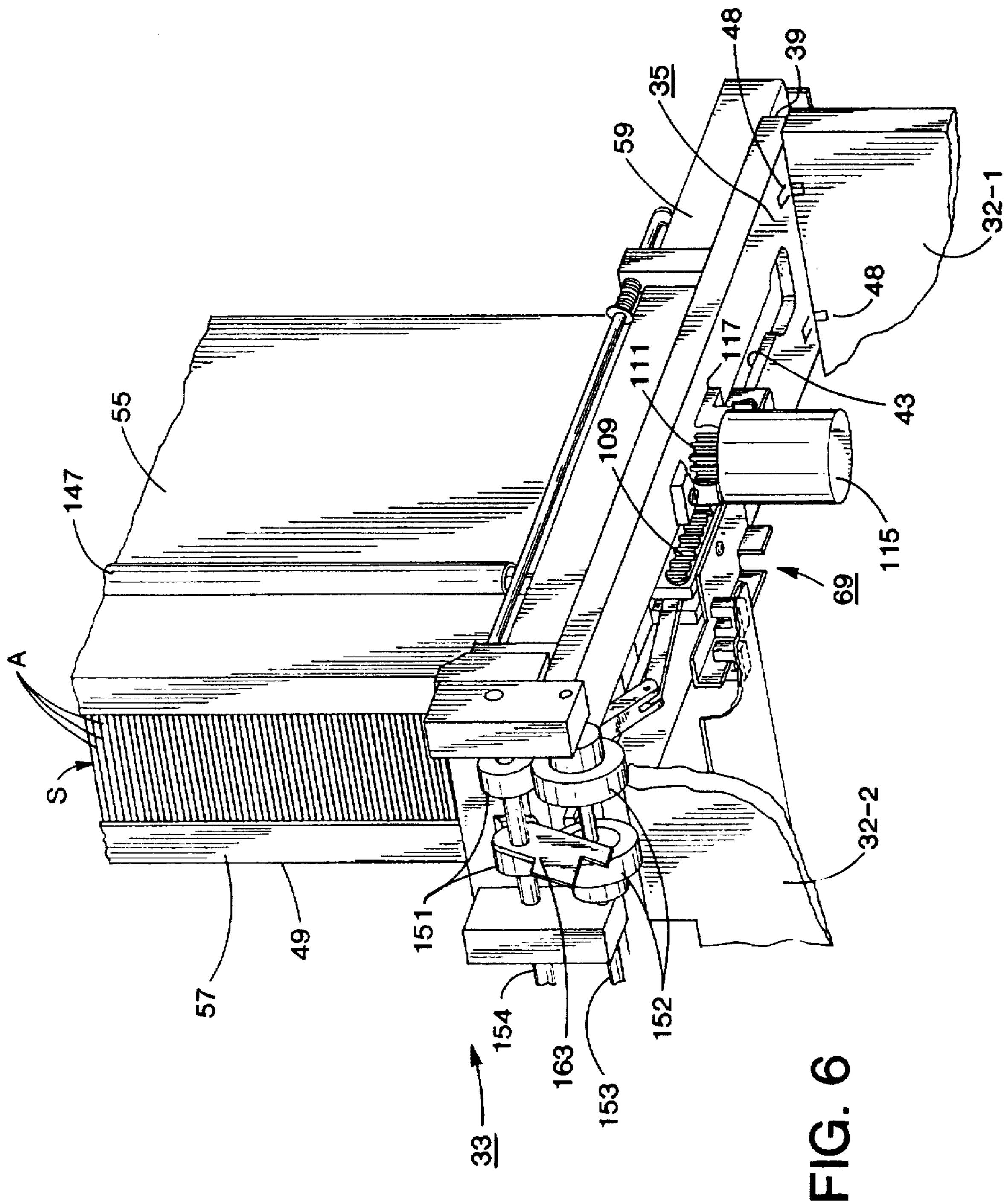
FIG. 6 is a fragmentary perspective view taken from the bottom and partly broken away of the article dispensing module shown in FIG. 1.
Figure 8:
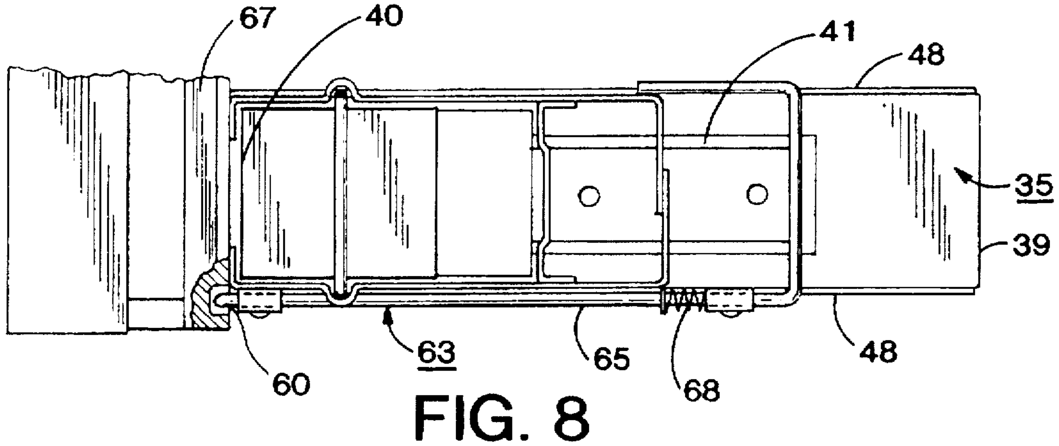
FIG. 8 is a fragmentary top view of the portion of the apparatus shown in FIG. 7.
Figure 7:
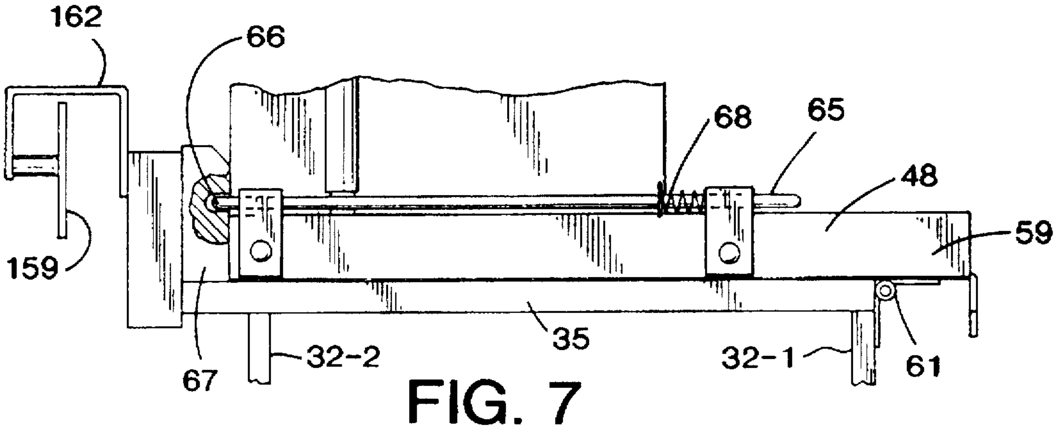
FIG. 7 is a fragmentary side view partly broken away showing one of the frames in the article dispensing module hingedly attached to its associated base and positioned vertically.
Figure 9:
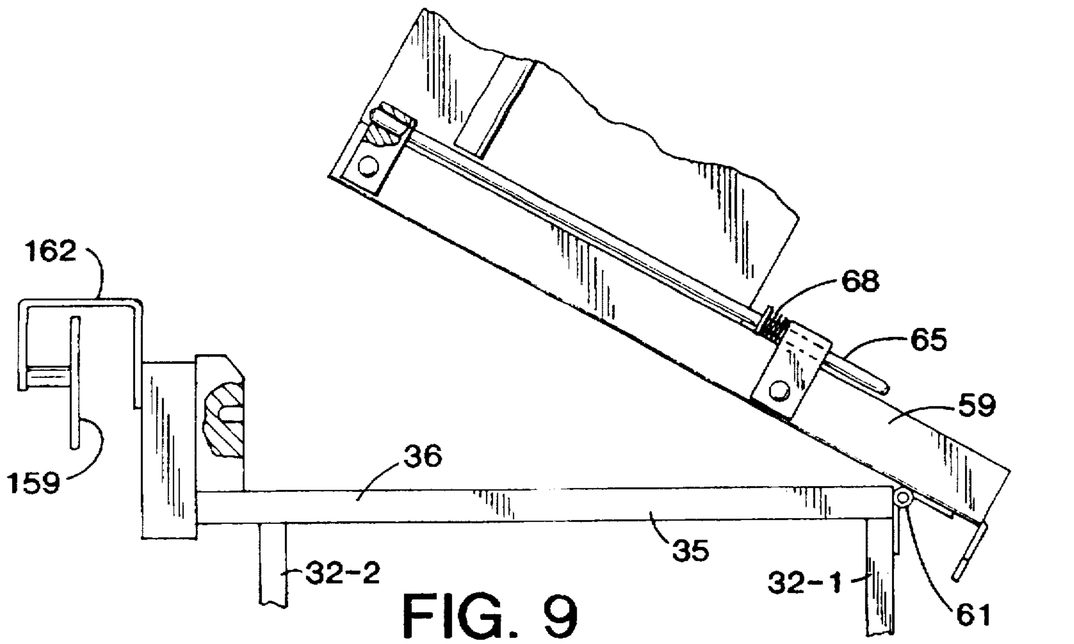
FIG. 9 is a fragmentary side view of the portion of the apparatus shown in FIG. 1, but with the frame tilted for loading purposes.
Figure 10:
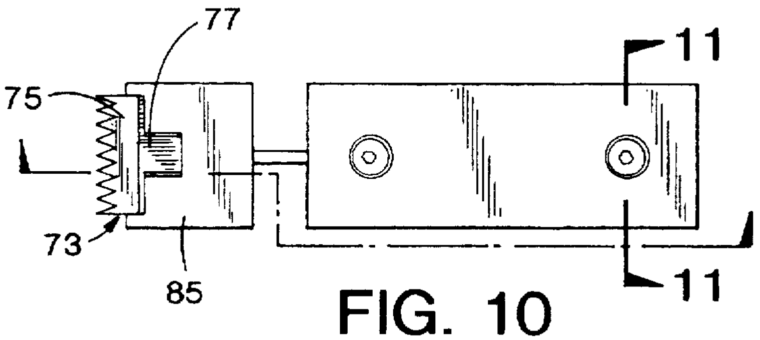
FIG. 10 is a top view of the two slider elements, toothed blade and linkage in the transport mechanism associated with each article dispensing assembly.
Figure 11:
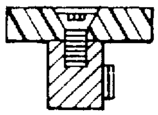
FIG. 11 is a section view taken along lines 11—11 in FIG. 10.
Figure 14:
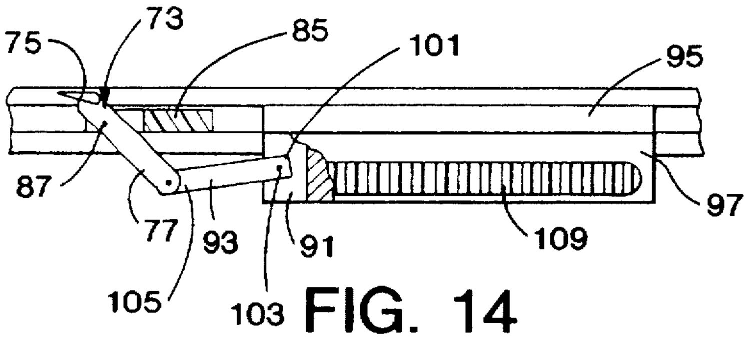
FIG. 14 is a fragmentary side section view showing the toothed base with the head of the toothed base in a horizontal position.
Figure 15:
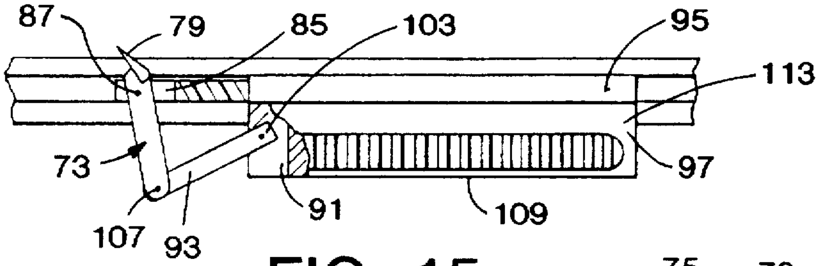
FIG. 15 is a fragmentary side section view showing the toothed blade with the head of the toothed blade angled up for engagement with an article.
Figure 12:
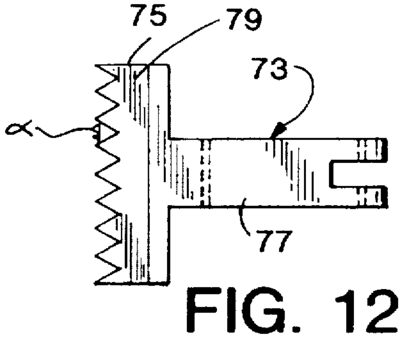
FIGS. 12 and 13 are top and side views, respectively of the toothed blade shown in FIG. 10.
Figure 16:
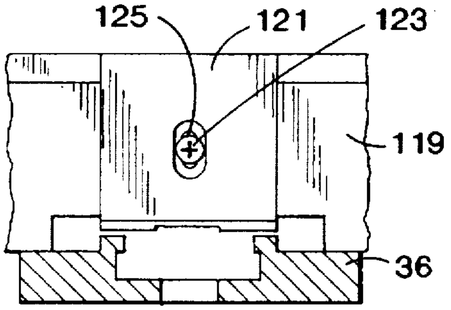
FIG. 16 is a fragmentary front view of the gate in one of the article dispensing assemblies.
Figure 13:
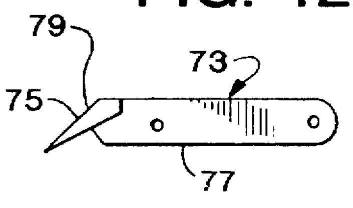
Figure 17:
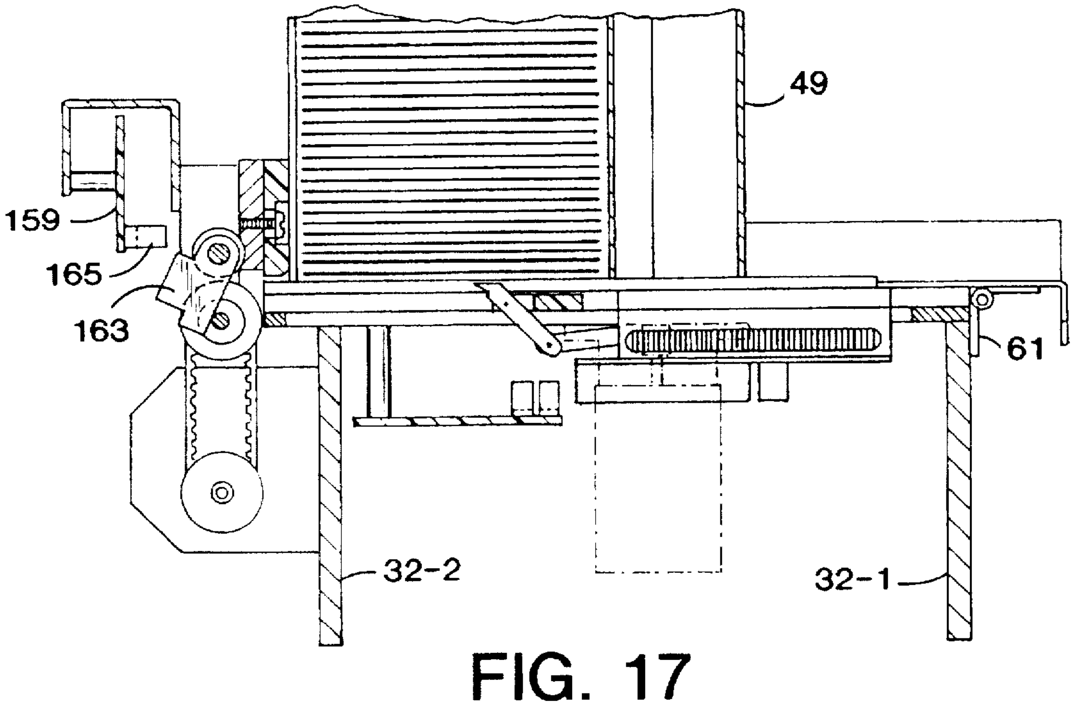
FIG. 17 is a fragmentary side section view of one of the article dispensing assemblies before the toothed blade is brought into engagement with an article.
Figure 18:
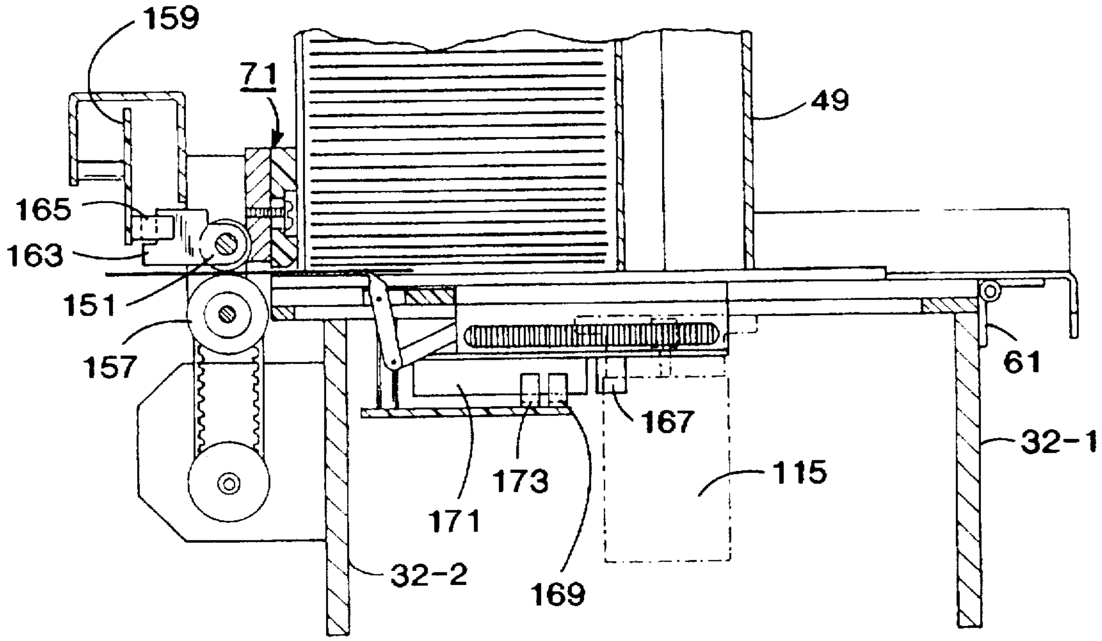
FIG. 18 is a fragmentary side section view of one of the article dispensing assemblies after the toothed blade is brought into engagement with an article.
Figure 20:
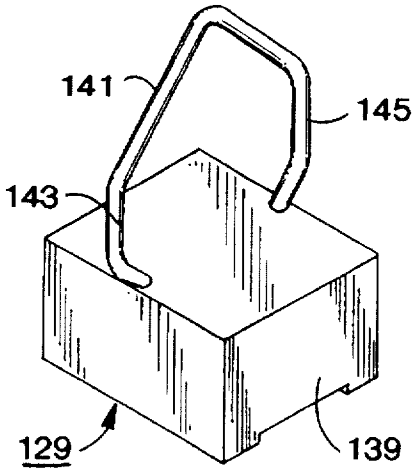
FIGS. 20 and 21 are front and bottom perspective views, respectively, of the weight shown in FIG. 4.
Figure 21:
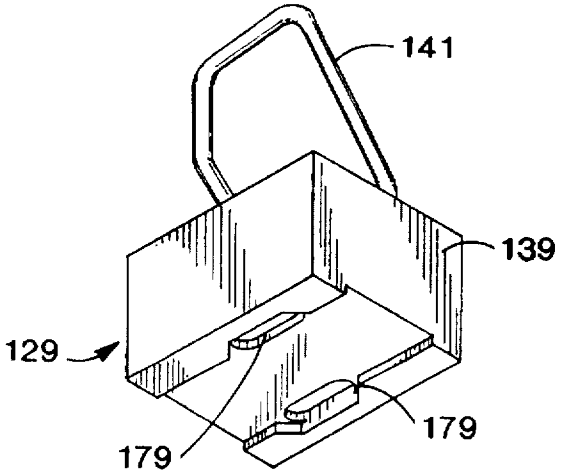
Figure 19:
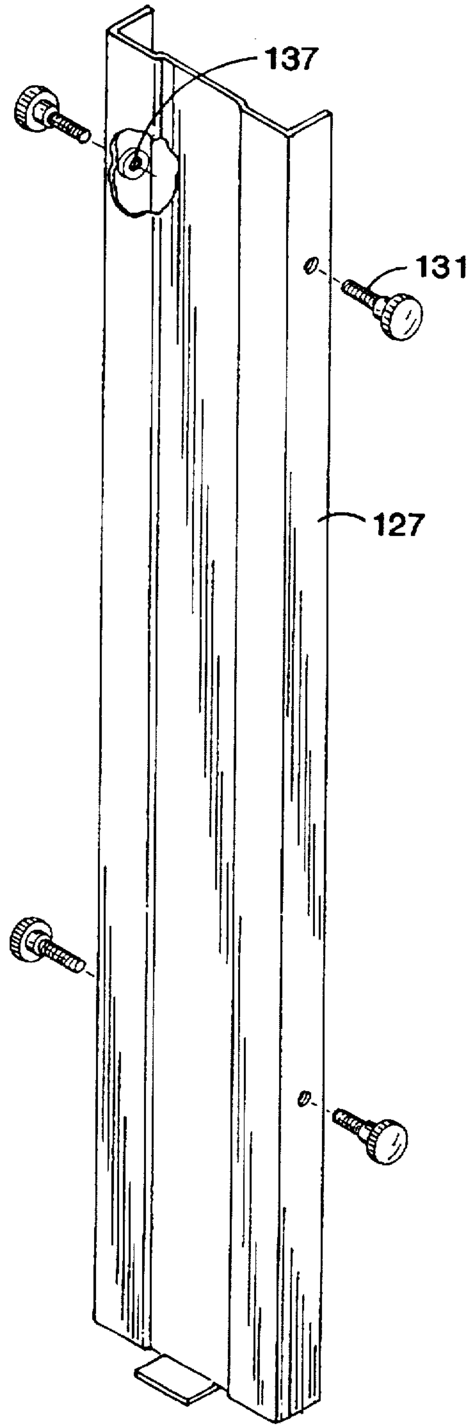
FIG. 19 is a perspective view of one of the partition walls shown in FIG. 3.
Figure 3A:
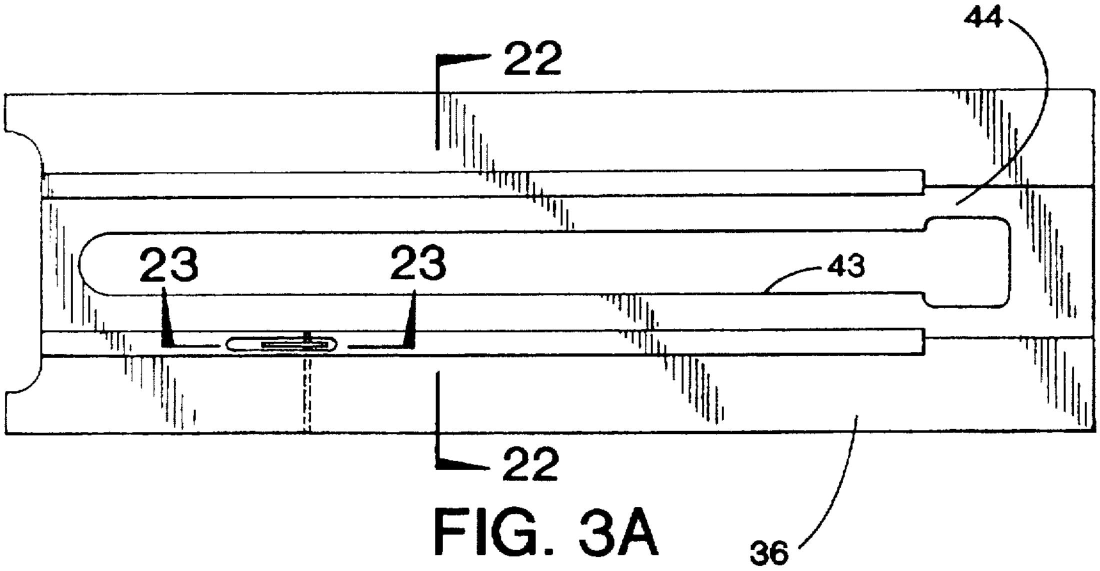
FIG. 3A is a plan view of one of the bases shown in FIG. 3.
Figure 22:
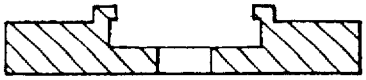
FIG. 22 is a section view taken along lines 22—22 in FIG. 3.
Figure 23:
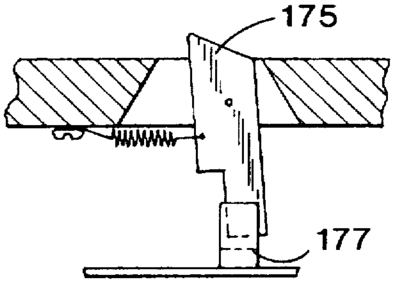
FIG. 23 is a section view taken along lines 23—23 in FIG. 3 with no tickets in the frame.
Figure 24:
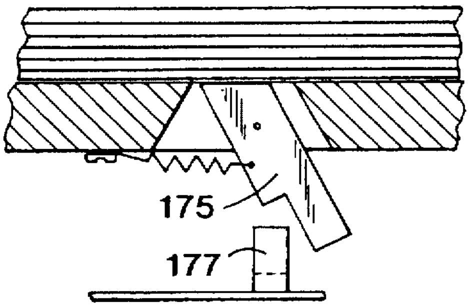
FIG. 24 is a section view similar to FIG. 23 but with articles to be dispensed in the frame.

Referring now to FIGS. 1 through 24 in the drawings, and first to FIGS. 1 and 2, there is shown an apparatus constructed according to this invention for dispensing articles such as tickets and cards, the apparatus being identified by reference numeral 11. Portions of apparatus 11 not pertinent to the invention are not shown.

Apparatus 11 includes a generally rectangular cabinet 13 having a back wall 15, a bottom wall 17, a top wall 19, a front wall 21 having an opening 22 through which articles are dispensed, left and right side walls 23 and 25, respectively, and a shelf 27. Front wall 21 includes a door 28 which is hingedly mounted to provide access to the interior of cabinet 13. Door 28 is normally maintained in a closed position by a lock 29. Shelf 27 is sized so that it does not extend back all the way to back wall 15 for a reason that will hereinafter became apparent. A control panel 30 having controls (not shown) for selecting the article to be dispensed from within apparatus and an opening (not shown) through which money is inserted is provided on front wall 21.

An article dispensing module 31 is disposed inside cabinet 13. Article dispensing module 31 includes a plurality of article dispensing assemblies 33 which are identical in construction, the number shown being for illustrative purposes only, and a pair of vertical support plates 32-1 and 32-2.

Each article dispensing assembly includes a generally rectangular base 35 having a front end 37, a rear end 39 and a longitudinally disposed rectangular recess 41 having an longitudinal opening 43. Bases 35 are fixedly secured by brackets 45 to support plates 32-1 and 32-2 which in turn are fixedly secured by brackets and bolts (not shown) to shelf 27.

Each article dispensing assembly 33 also includes an elongated frame 49 for enclosing a plurality of articles A to be dispensed in a stack S, one on top of the other. Articles A may be, for example, pull-tab type lottery tickets or plastic telephone credit cards or the like. Frame 49 is generally rectangularly shaped in cross section and includes a front wall 51, left and right side walls 53 and 55, respectively and a rear wall 57 that is open at the middle.

Frame 49 is fixedly mounted on a bracket assembly 59 which is pivotally attached to support 32-1 by a hinge 61. The pivotal attachment of frame 49 to support 32-1 allows frame 49 to be pivoted forward from a vertical position, which is the intended position it is in for dispensing articles A, to an angled position where articles A to be dispensed can be easily loaded into frame 49 from the top by a person standing in front of cabinet 13. A locking mechanism 63 is provided for releasably locking frame 49 in place in a vertical position. Locking mechanism 63 includes a U shaped rod 65 slidably mounted on bracket assembly 59 and having one end 60 adapted to slip into hole 66 on the back of a plate 67 attached to base 35. A spring 68 is provided for urging rod 65 in a backward direction toward holes 66.

Each article dispensing assembly 33 further includes a transport mechanism 69 and a gate 71. Transport mechanism 69 is located below frame 49 and gate 71 is located behind frame 49. The purpose of transport mechanism 69 is to transport articles A from stack S into gate 71. The purpose of gate 71 is to receive articles A transported to it from frame 49 and allow only one article at a time to pass through.

Transport mechanism 69, includes a toothed blade 73 made of tool steel. Blade 73 is a unitary structure and includes a head portion 75 and a stem portion 77. Head portion 75 includes a top surface 79 and a front edge having teeth 79-1. The angle between adjacent teeth 79-1 is preferably about 30 degrees. This angle enables the teeth 79-1 to easily and security grip onto plastic as well as cardboard articles 81. Stem portion 77 is bifurcated at its lower end 83. Blade 73 is mounted for pivotal movement on a first slider element 85 by a pivot pin 87 which extends through a hole formed in slider element 85 and a hole formed in the stem 77 of toothed blade 73. First slider element 85 is generally rectangularly shaped and is mounted for slidable movement back and forth in recess 44 of horizontal base plate 36.

Toothed blade 73 is coupled to a second slider element 91 by an elongated link 93. Second slider element 91 includes an upper piece 95 and a lower piece 97 which are fixedly secured to each other by bolts (not shown). One end 101 of link 93 is pivotally attached to second slider element 91 by a pivot pin 103. The other end 105 of link 98 is pivotally attached to the bottom 107 of the stem portion 77 of toothed blade 73 by a pivot pin 107. Second slider element 91 is slidably mounted in recess 41 of base plate 36 behind first slider element 85 with piece 95 seated in recess 41 and piece 97 disposed underneath base 35. With the two sliders spaced apart top surface 79 of head 75 is horizontal. Movement of second slider element 91 in recess 41 in a rearward direction toward first slider element 85 will result in pivotal movement downward of link 93. This in turn will produce pivotal movement upward of head portion 75 of toothed blade 73 in first slider element 85. Head portion 75 will continue to pivot upward until second slider element 91 hits up against first slider element 85. At this time, top surface 79 is pivoted up about 10 degrees from the horizontal. When second slider 91 is moved in a forward direction head portion 75 will be pivoted back to a horizontal position. First and second slider elements 85 and 91, respectively, are made of a rigid plastic material, such as Delrin.

Second slider element 91 is moved back and forth in recess 41 by a rack 109 and pinion 111 combination. Rack 109 is press fit into a longitudinal recess formed in the side 113 of second slider element 91. Pinion 111 is driven by a vertically disposed reversible motor 115 which is fixedly mounted on base 35 by a bracket 117. Bracket 117 is fixed to base 35 by bolts. As can be seen, by having rack 111 on the side of element 91 and motor 115 extending vertically down, motor 115 does not extend out laterally beyond base 35. As a result, adjacent assemblies 33 can be disposed closely next to each other rather than having to be spaced apart because of the motors 115.

Gate 75 includes a support 119 and a slider element 121. Slider element 121 is slidably mounted for up and down movement on plate 67, the space between the bottom of slider 121 and base plate 36 serving as an opening through which an article A can pass. The height of the opening is controlled by raising or lowering slider 121. Slider 121 is fixed at a desired height by a screw 123 which extends through an oval shaped hole 125 in slider 121 into a threaded opening (not shown) in plate 67.

Each article dispensing assembly 33 further includes a U shaped partition wall 127 and a removable weight 129. Partition wall 127 is used to change the area inside frame 49 to snugly hold different sized articles A without having to disassemble frame 49 and replace it with a different sized frame. Partition wall 127 is mounted on frame 49 by bolts 131 which fit into notched recesses 133 and 135 on the sidewalls of frame 49 and are secured in place by nuts 137. Removable weight 129 is used to push stack S down within frame 49 so that toothed blade 73 will engage the lowermost article in stack S and move it by frictional engagement. Weight 129 comprises a block 139 of heavy material. A handle 141 is provided for holding block 139. Handle 141 is shaped to include a pair of side portions 143 and 145 which are shaped so as to slide within a pair of grooves 147 and 149 in the sides of frame 49. This limits movement of weight 129 in frame 49 to up and down so that it will always be centered properly in frame 49 directly above transport mechanism 69 regardless of the position of wall 127 within frame 49.

Article dispensing module 31 also includes two sets of exit rollers 151 and 152 for pulling articles A being dispensed out from gates 75. Rollers 151 and 152 are disposed behind gates 75. Rollers 151 and 152 are mounted on shafts 154 and 153, respectively, which are coupled by a belt 155 to a drive motor 157.

Article dispensing module 31 also includes two printed circuit boards 159 and 161 for holding electronics for the module. Board 159 is mounted on a bracket 162 attached to base 35. Board 161 is mounted on base 35.

Each article dispensing assembly 33 also includes a first sensor assembly for sending out a signal each time an article passes through the gate, second and third sensor assemblies for sending out signals for controlling movement of the motor coupled to the rack and pinion and a fourth sensor assembly for sending out a signal when there are no articles in the frame. First sensor assembly includes a flag 163 rotatably mounted on shaft 154 and an optical sensor 165 on board 159 fixed to support 38. Second sensor assembly includes a flag 167 on second slider and an optical sensor 169. Third sensor assembly includes a flag 171 and an optical sensor 173. Fourth optical sensor includes a flag 175 and an optical sensor 177.

Block 139 in weight 129 has a pair of holes 179 located so that when there are no articles A left in frame 49, weight 129 will not press down on flag 175.

Apparatus 11 also includes an angled tray 178 below shelf 27 and a computer C for controlling the overall operation of apparatus. Computer C is coupled to boards 159 and 161 by cables (not shown).

In the operation of apparatus 11, articles A to be dispensed are first loaded into frames 49. Articles in each frame 49 need not be the same type of item. Articles are moved from frames 49 to their respective gates 71 by their respective transport mechanisms 69, on instructions from computer C, then ejected from gates 71 by exit rollers 151 where they drop down behind shelf 27 into tray 173 and then slide forward on tray to opening 22 in the front of cabinet 13 where they are picked up by the purchaser. Since gates 71 and exit rollers 151 and 152 are located inside cabinet 13 at the rear, tampering with the exit mechanism, i.e. gates 71 and rollers 151, from the front is avoided.

Figure 25:
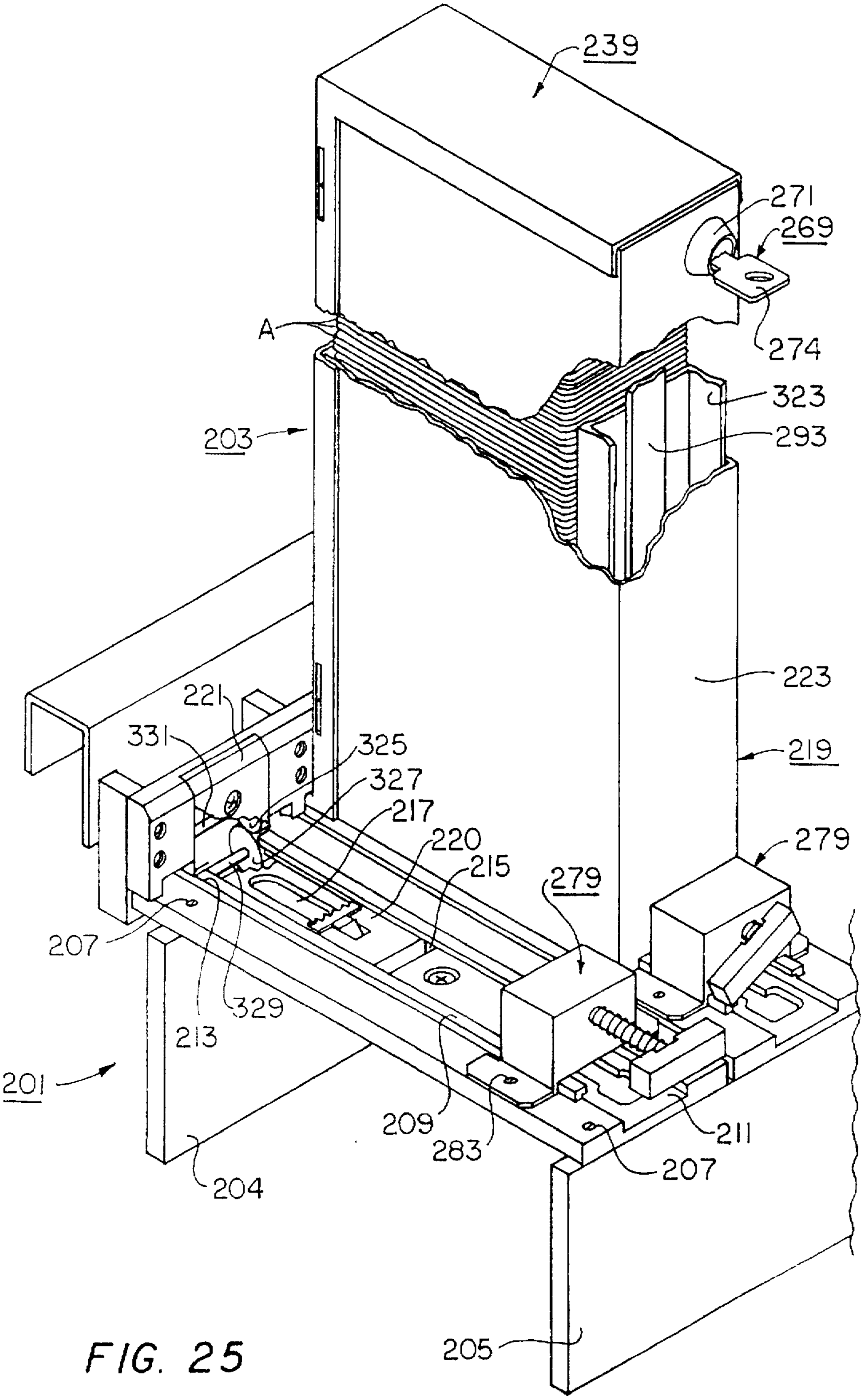
FIG. 25 is a perspective view partly broken away from the front of another embodiment of an apparatus constructed according to this invention for dispensing articles.
Figure 26:
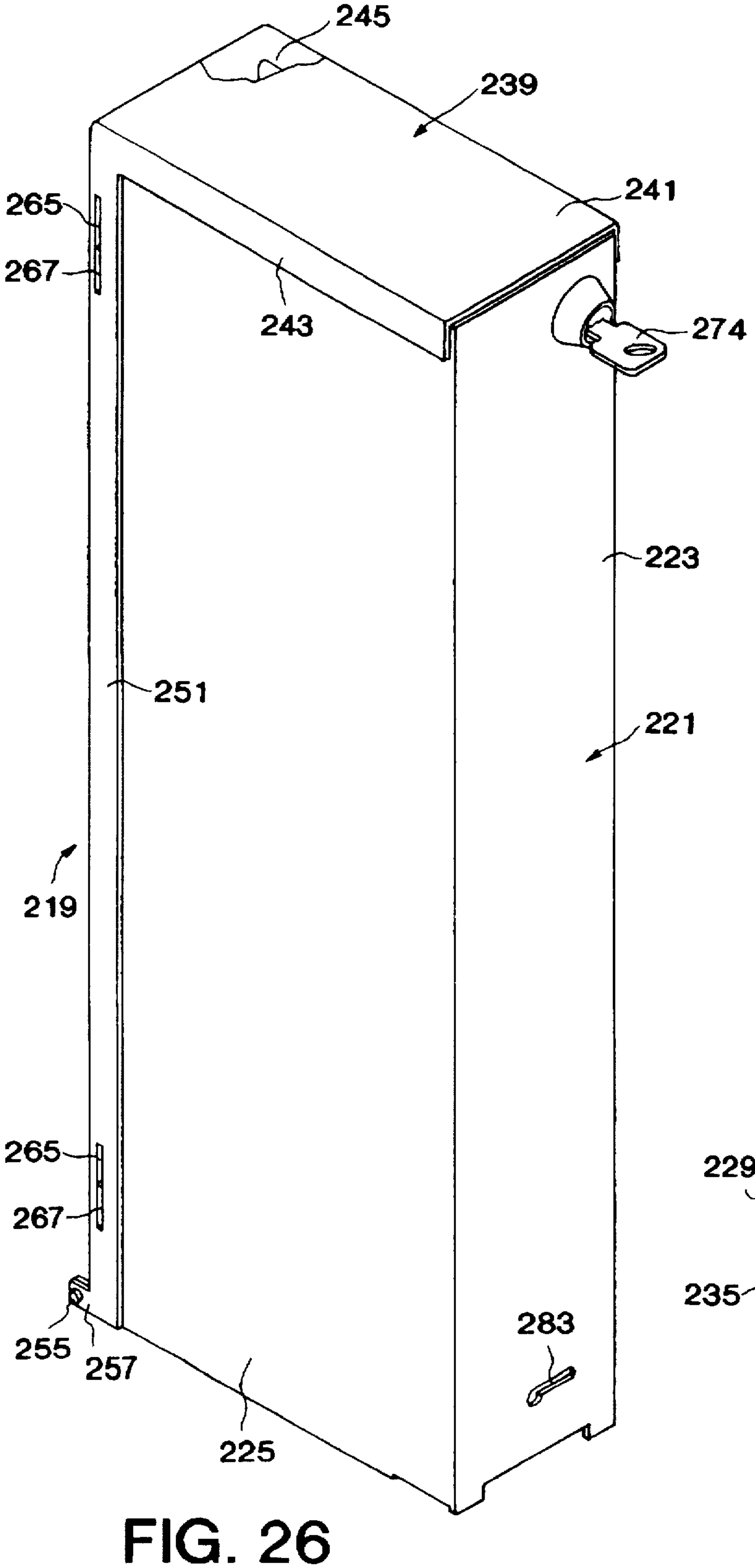
FIG. 26 is a perspective view of the frame shown in FIG. 25.
Figure 38:
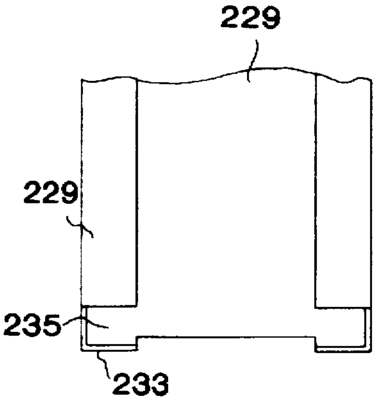
FIG. 38 is a fragmentary back end view of the main panel of the frame shown in FIG. 27.

Referring now to FIG. 25, there is shown a fragmentary view partly broken away of a modification of article dispensing module 31, the modification of the article dispensing module being identified by reference numeral 201. Portions of article dispensing module 201 not pertinent to the invention are not shown.

Article dispensing module 201 includes a plurality of article dispensing assemblies 203 which are identical in construction, only one and a portion of another one being shown for illustrative purposes. Article dispensing assemblies 203 are mounted on a pair of vertical support plates 204 and 205 and secured thereto by bolts 207.

Each article dispensing assembly 203 includes a generally rectangular base 209 having a front end 211, a rear end 213 and a longitudinally disposed rectangular recess 215 having a longitudinal opening 217.

Each article dispensing assembly 203 also includes an elongated frame 219 for enclosing a plurality of articles A to be dispensed in a stack S, one on top of the other. Articles A may be, for example, pull-tab type lottery tickets or plastic telephone cards, debit cards or the like. For illustrative purposes, only one frame 219 is shown in FIG. 25. Frame 219 is removably mounted on base 209.

Each article dispensing assembly 203 further includes a transport mechanism 220 identical to transport mechanism 69 and a gate 221 identical to gate 71. Transport mechanism 220 is located below frame 219 and gate 221 is located behind frame 219. The purpose of transport mechanism 220 is to transport articles A from stack S into gate 221. The purpose of gate 221 is to receive articles A transported to it from frame 219 and allow only one article at a time to pass through.

Frame 219, which is also shown in FIGS. 26 through 36, is generally rectangular in cross section, and includes a generally rectangularly shaped main panel 221 shaped to define a front wall 223, a pair of side walls 225 and 227, a rear wall 229 having an opening 230 at the middle, an open top 231 through which articles A can be loaded into frame 219 and a bottom wall 233 having an opening 237 at the middle so that the bottom article in the stack can be moved by the transport mechanism 220 which extends forward from rear wall 229 but not all the way to front wall 223. As can be seen, rear wall 229 does not extend all the way down to bottom wall 233 but rather stops just before bottom wall 233 so as to leave a space 235 through which articles can exit frame 219.

Frame 219 also includes a cover 239 for covering open top 231 and opening 23 in frame 219. Cover 239 includes a top portion 241 which includes a rectangular panel portion 243 having side flanges 245 and 247 and a side portion 249 which includes a rectangular panel portion 250 having side flanges 251 and 253, top portion 241 and side portion 249 defining an L shaped cover. Cover 239 is pivotally mounted on sheet 221 by pivot pins 255 which extend through end flanges 257 at the bottom of side flanges 251 and 253 and through end flanges 259 at the bottom of side walls 225. As can also can be seen, the bottom edge 261 of side panel 249 is spaced up from the bottom edges 262-1 and 262-2 of side flanges 245 and 247 so that articles A may be moved out of frame 219 from underneath bottom edge 261.

Figure 33:
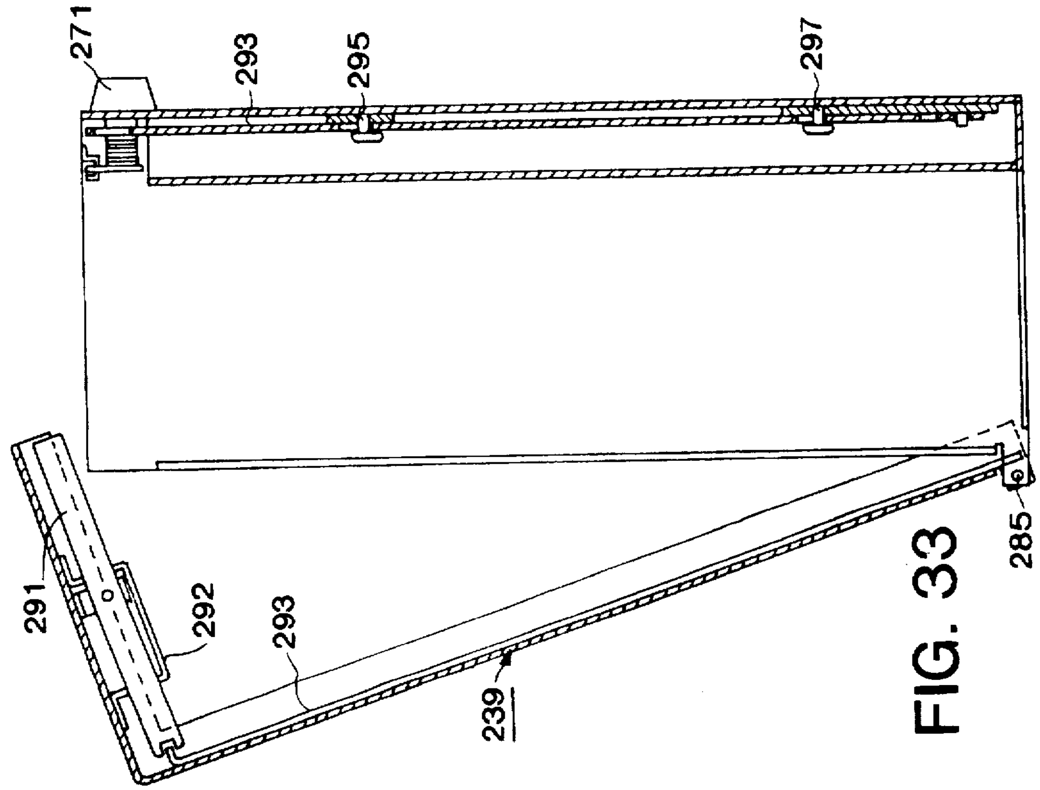
FIG. 33 is a side section view of the frame shown in FIG. 16 with the cover pivoted forward.
Figure 36:
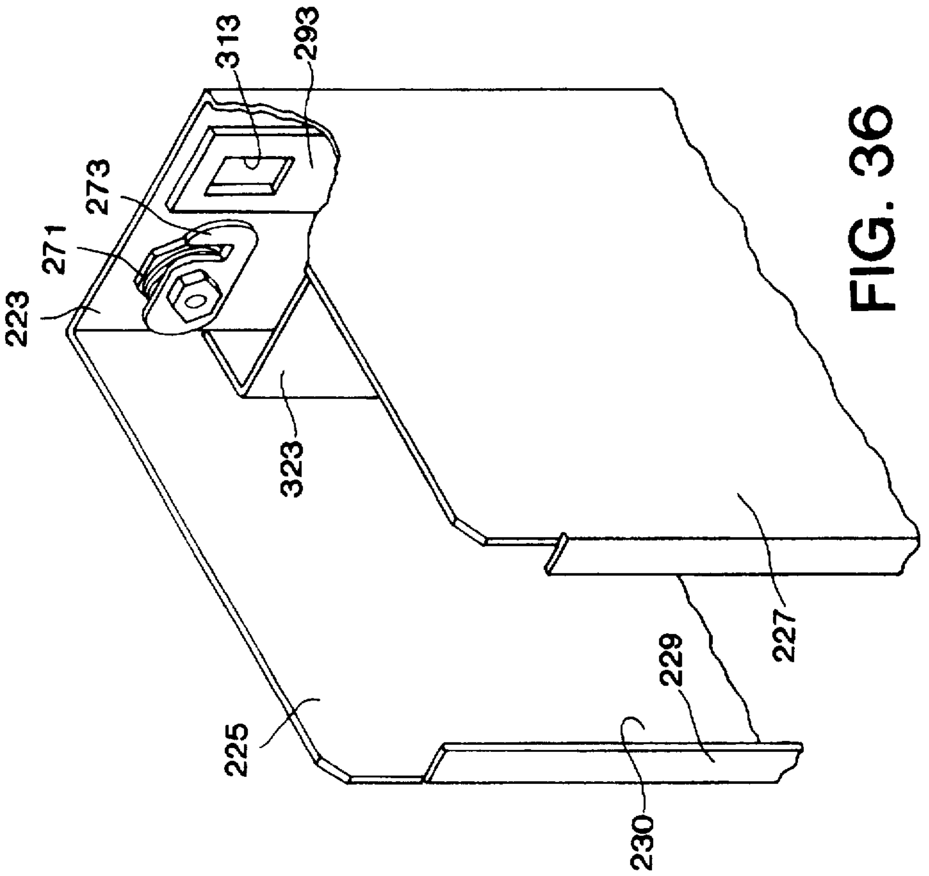
FIG. 36 is a fragmentary perspective view of the top inside portion of the cover in the frame in FIG. 2.
Figure 35:
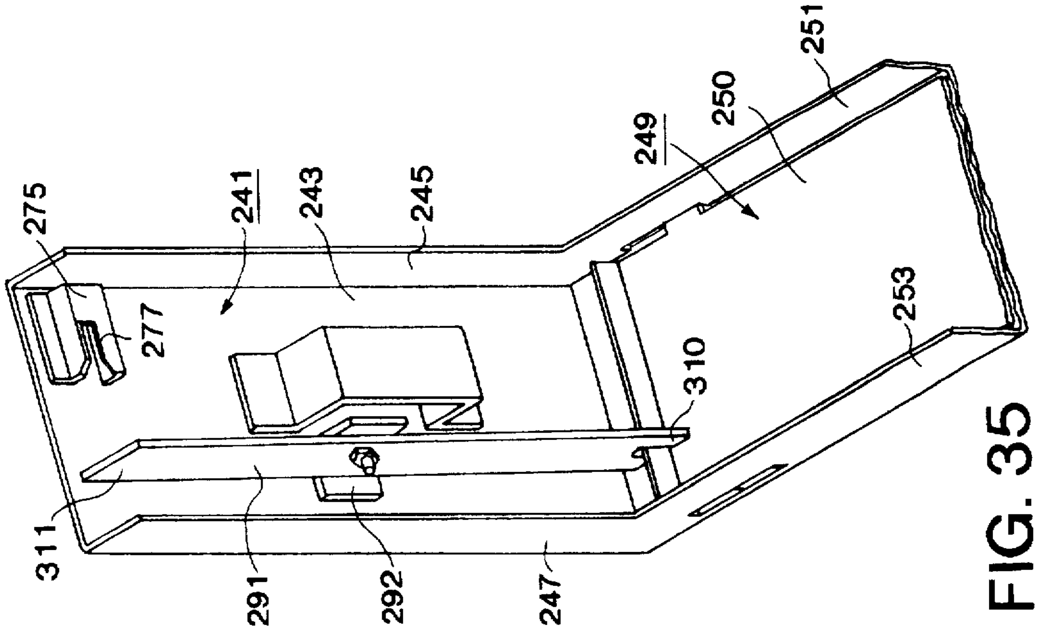
FIG. 35 is a fragmentary perspective view of the top inside portion of the cover in the frame in FIG. 2.
Figure 37:
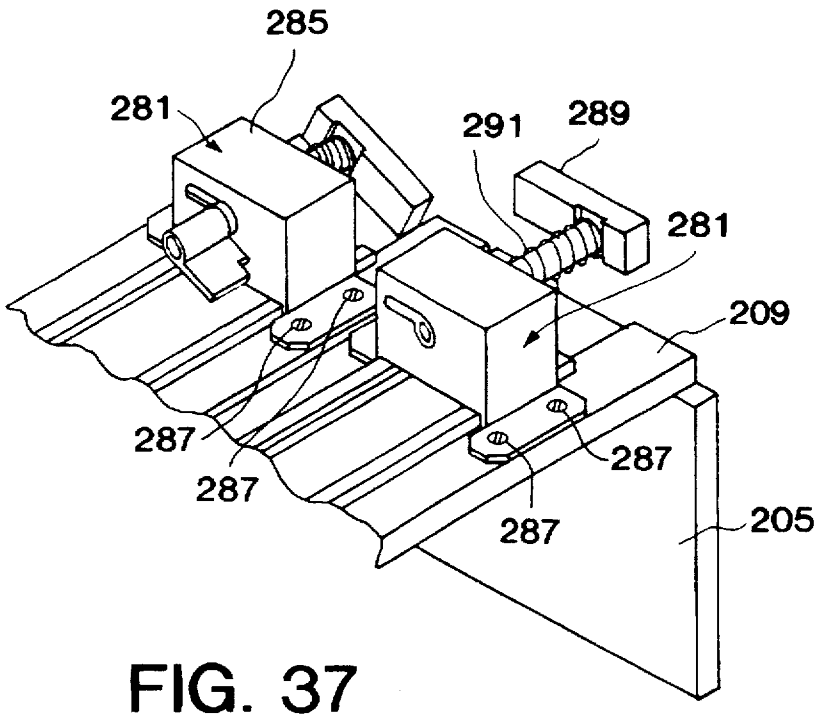
FIG. 37 is a fragmentary perspective view from the front of the frame locking key assemblies shown in FIG. 1.

When cover 239 is in an open position as shown in FIG. 33 articles A may be loaded into frame 219 from the top as shown by arrows A. On the other hand, when cover 239 is in a closed position, as shown for example in FIG. 26, the opening at the at the top of frame 219 is completely covered and articles A cannot be removed through that opening. As can also be seen, when cover 239 is in a closed position opening 230 is completely covered.

Figure 28:
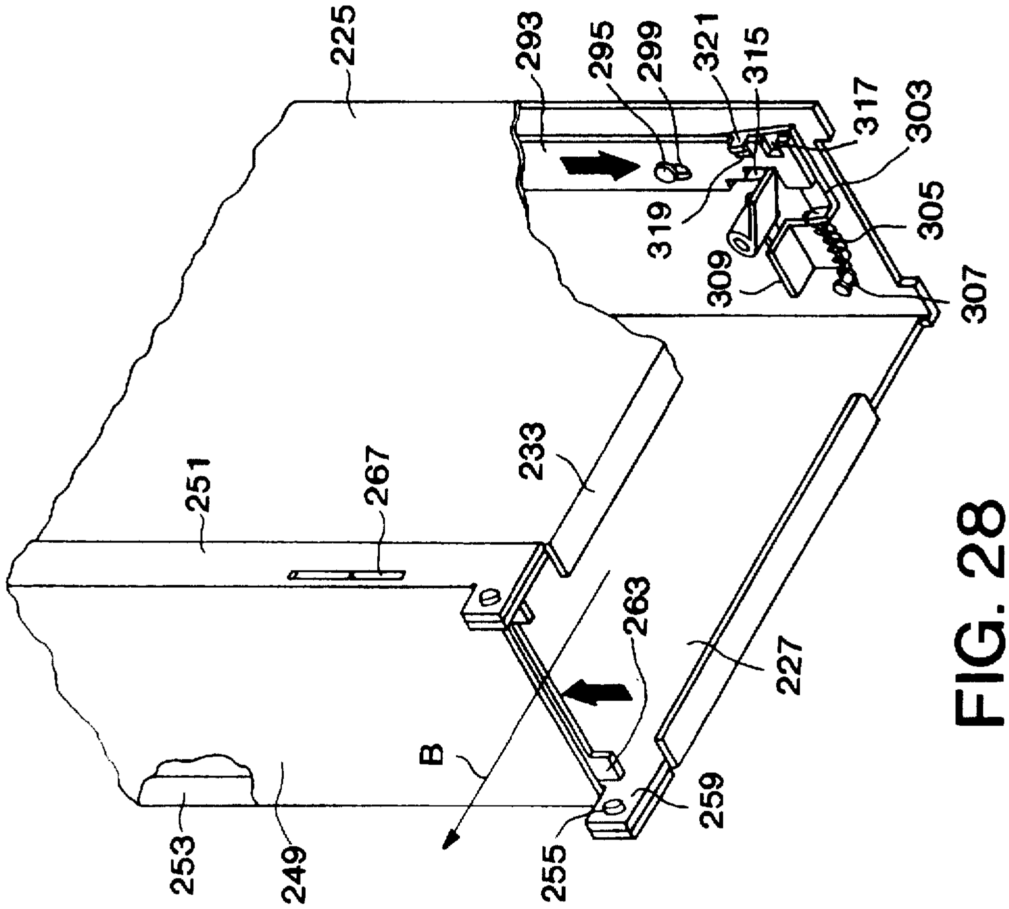
FIG. 28 is a fragmentary perspective view taken from the bottom and partly broken away of the frame as shown in FIG. 27 but with the gate in the frame in a raised position.
Figure 27:
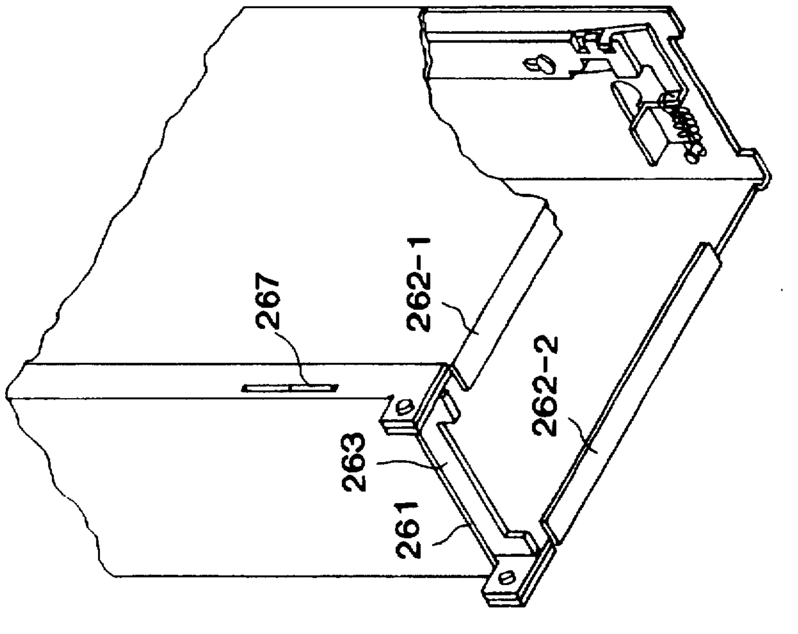
FIG. 27 is a fragmentary perspective view taken from the bottom and partly broken away of the frame shown in FIG. 26 with the gate in the frame in a lowered position and the spacer plate inside the frame removed.
Figure 29:
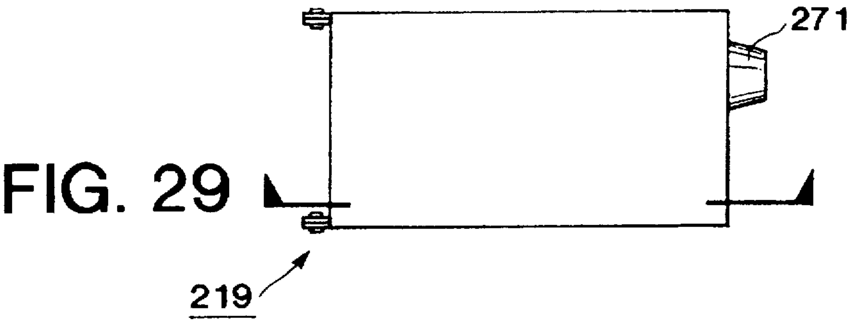
FIG. 29 is a top view of the frame shown in FIG. 26.
Figure 30:
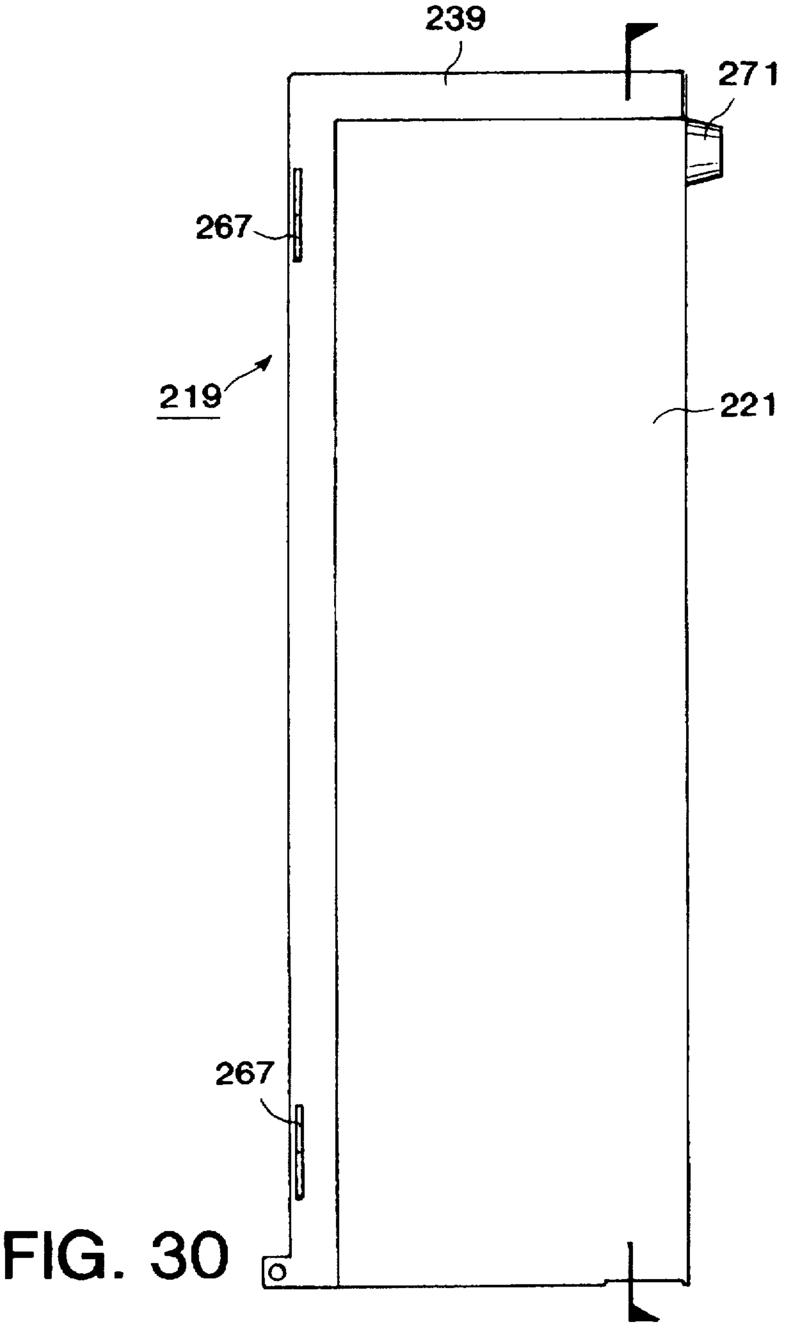
FIG. 30 is a side view of the frame shown in FIG. 26.
Figure 31:
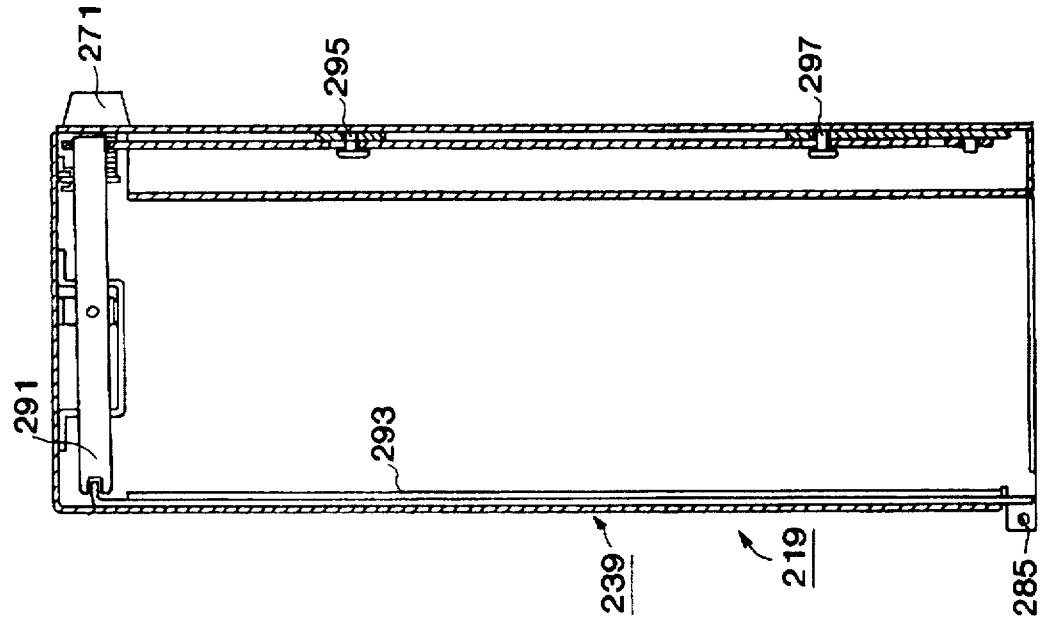
FIG. 31 is a section view taken along lines 31—31 in FIG. 29 with a gate in a lowered position.
Figure 32:
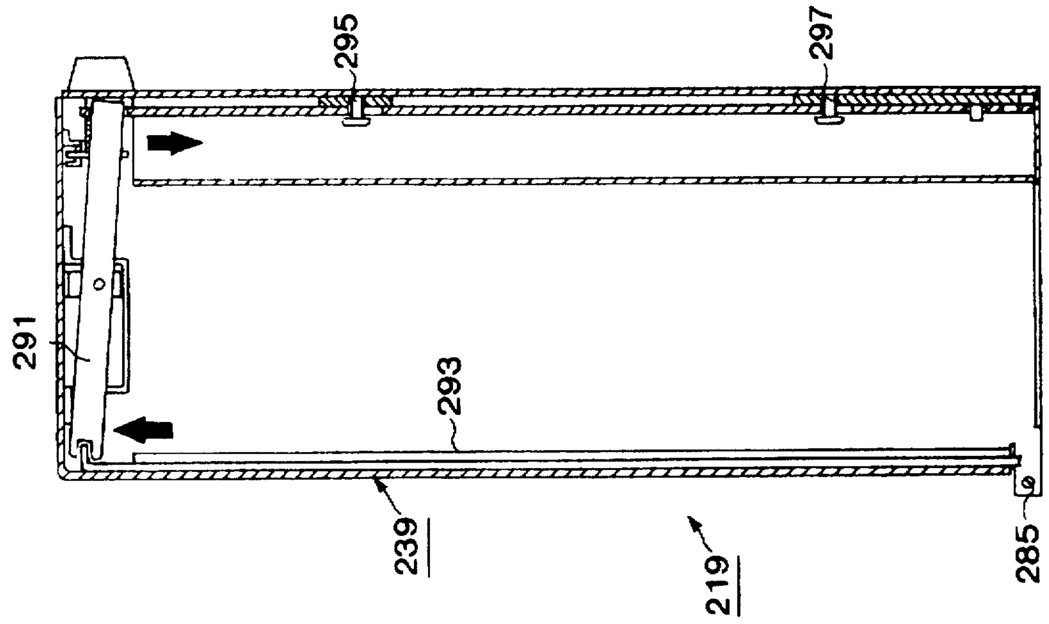
FIG. 32 is a section view similar to that shown in FIG. 31 but with the gate in a raised position.
Figure 39:
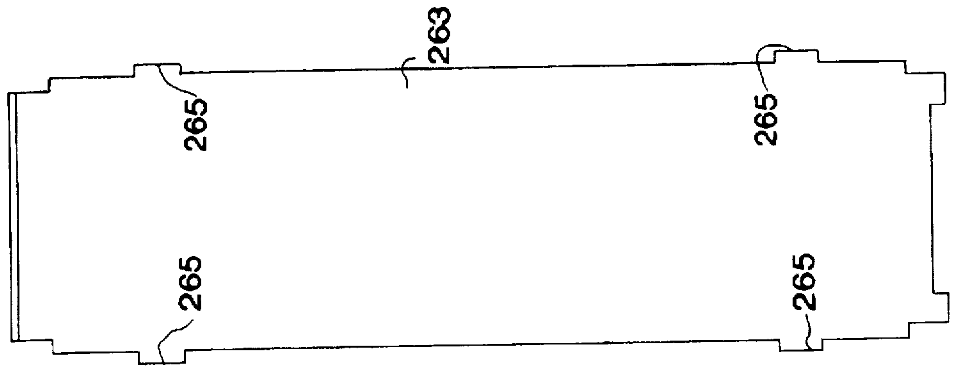
FIG. 39 is a plan view of the gate inside the frame shown in FIG. 27.
Figure 34:
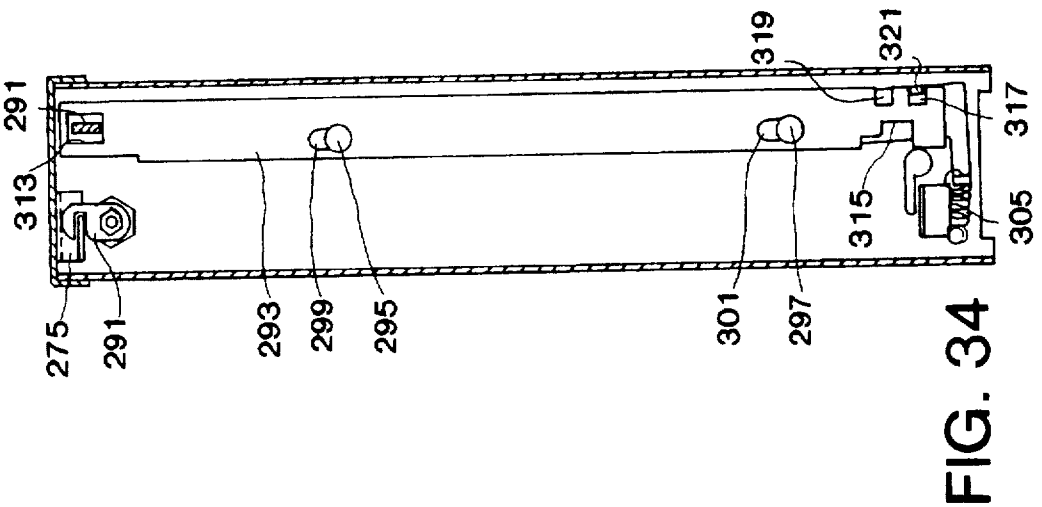
FIG. 34 is a back section view of the frame shown in FIG. 2.

Frame 219 further includes a gate 263 which is slidably mounted for up and down movement inside frame 219 on side portion 249 of cover 239 for controlling the exiting of articles A from within frame 219. The slidable mounting of gate 263 is achieved through side tabs 265 on gate 263 which ride in slots 267 formed on side portion 249. When gate 263 is in a lowered position as shown in FIG. 27 articles A inside frame 219 cannot exit frame 219 from underneath side portion 249 of cover 239. On the other hand, when gate 263 is in a raised position as shown in FIG. 28 articles A can exit from frame 219 underneath side portion 249 of cover 239 in the direction shown by arrow B.

Frame 219 also includes a first locking mechanism 269 for locking cover 239 in a closed position on frame 219. First locking mechanism 269 includes a lock 271 fixedly mounted on front wall 223 of frame 219 and having a movable arm 273, a removable key 274 for turning arm 273 and a bracket 275 on the inside of top portion 241 of cover 239, bracket 275 having an engagement slot 277 for engagement by arm 273. When cover 239 is closed and arm 273 is turned so that it is inside slot 277, cover 239 is locked shut on main panel 221. On the other hand, when arm 273 is not inside slot 277, cover 239 is not in a locked position. Bracket 275 is positioned on top portion 241 so that arm 273 can extend into slot 277 only when cover 239 is in a fully closed position on main panel 221.

Article dispensing assembly 203 further includes a second locking mechanism 279 for locking frame 219 in place on base 209. Locking mechanism 279 includes a key assembly 281 and a keyhole 283. Keyhole 283 is formed on front wall 223 of frame 219 near the bottom. Key assembly 281 includes a bracket 285 fixedly mounted on base 209 by bolts 287, a key 289 slidably mounted on bracket 285 and a spring 291 for urging key 289 forward (i.e. away from frame 219). When key 289 is inserted into keyhole 283 and turned, frame 219 will be locked in place on base 209.

Frame 219 also includes a lever arm 291 pivotally mounted on a bracket 292 fixed to top portion 241 of cover 239, a first coupling arm 293 slidably mounted on front wall 223 inside frame 219 on pins 295 and 297 which ride in slots 299 and 301 for up and down movement and a second coupling arm 303 pivotally connected at one end to pin 297 and connected at the other end to a spring 305 attached by a pin 307 to a blocking plate 309. One end 310 of lever arm 291 is pivotally mounted on gate 263.

When cover 239 is not in a fully closed position on main panel 221 of frame 219, gate 263 can be slidably moved up and down on rear wall 229. On the other hand, when cover 239 is fully closed on main panel 221, and either locked shut or unlocked, end 311 of lever arm 291 will extend through a rectangular opening 313 near the top of first coupling arm 293, thereby locking gate 263 in its lowered (down) position. Thus, when cover 239 is fully shut, closed articles A cannot exit from underneath bottom wall 233 and when cover 239 is locked, articles cannot be removed from the top of frame 219.

When frame 219 is mounted on base 209 and key 289 is inserted in keyhole 283 and turned, key 289 will, in addition to locking frame in place on base 209, engage a slot 315 near the bottom of first coupling arm 293 and move first coupling arm 293 to a down position. When arm 293 is moved to a down position, as it moves it will pivot lever arm 291 which in turn will raise gate 263.

Thus, key 289 performs two functions when inserted and turned; namely, (1) locks frame 219 in place on base 207 and (2) at the same time raises gate 263.

First coupling arm 293 has two notches 317 and 319 and second coupling arm 303 has a tab 321 when first coupling 303 is in an up position, tab 321 engages notch 317 and when first coupling arm 293 is in a down position, tab 321 will engage notch 317.

Frame 219 also includes a U-shaped spacer bracket 323 which is fixedly mounted inside frame 219.

Article dispensing module 201 further includes two sets of exit rollers 325 and 327, identical to rollers 151 and 152. Rollers 325 and 327 are mounted on shafts 329 and 331 which are coupled by a belt (not shown) to a drive motor (not shown).

Figure 40:
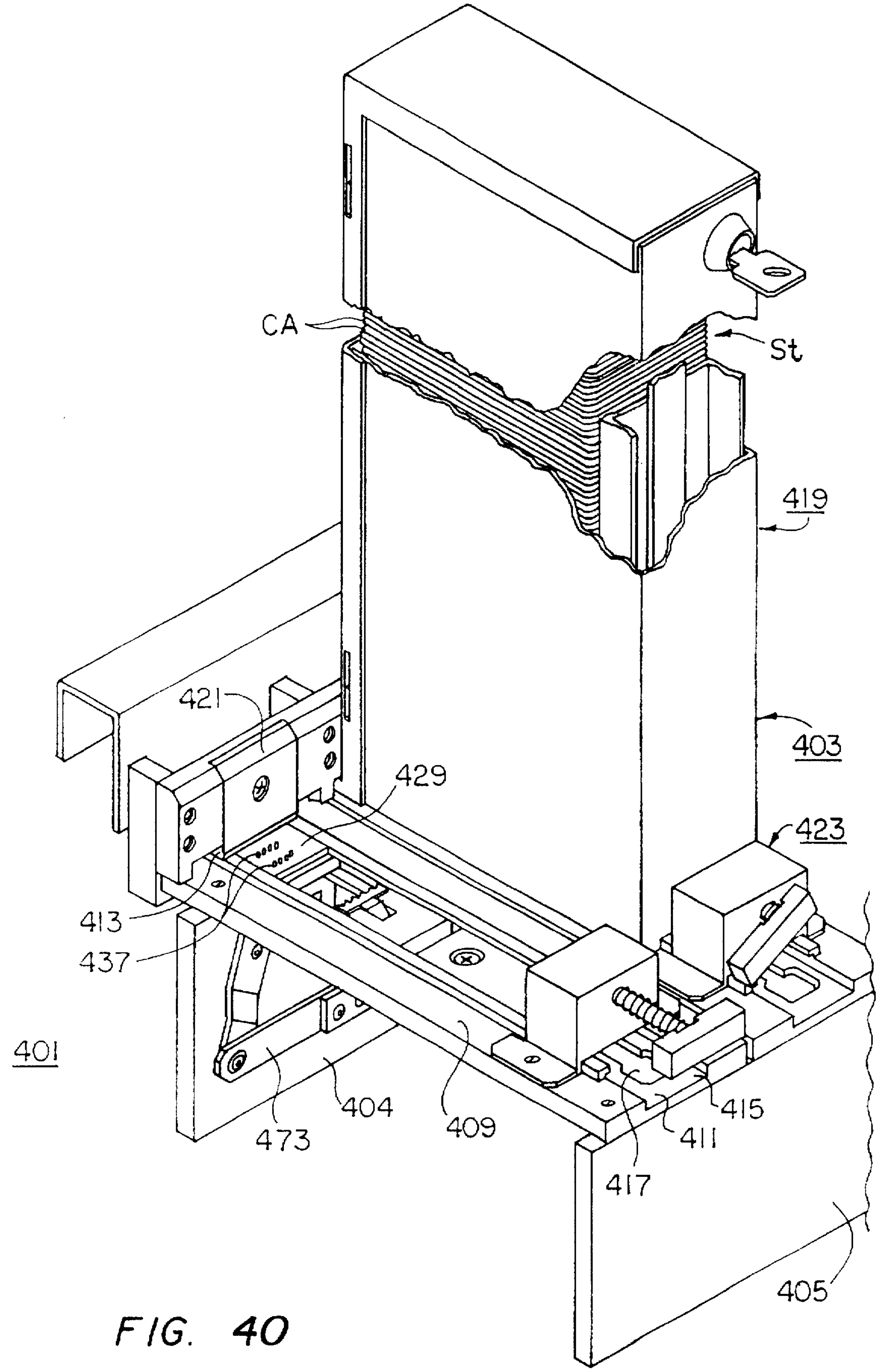
FIG. 40 is a perspective view from the front and partly broken away of another embodiment of an apparatus constructed according to this invention.
Figure 40A:
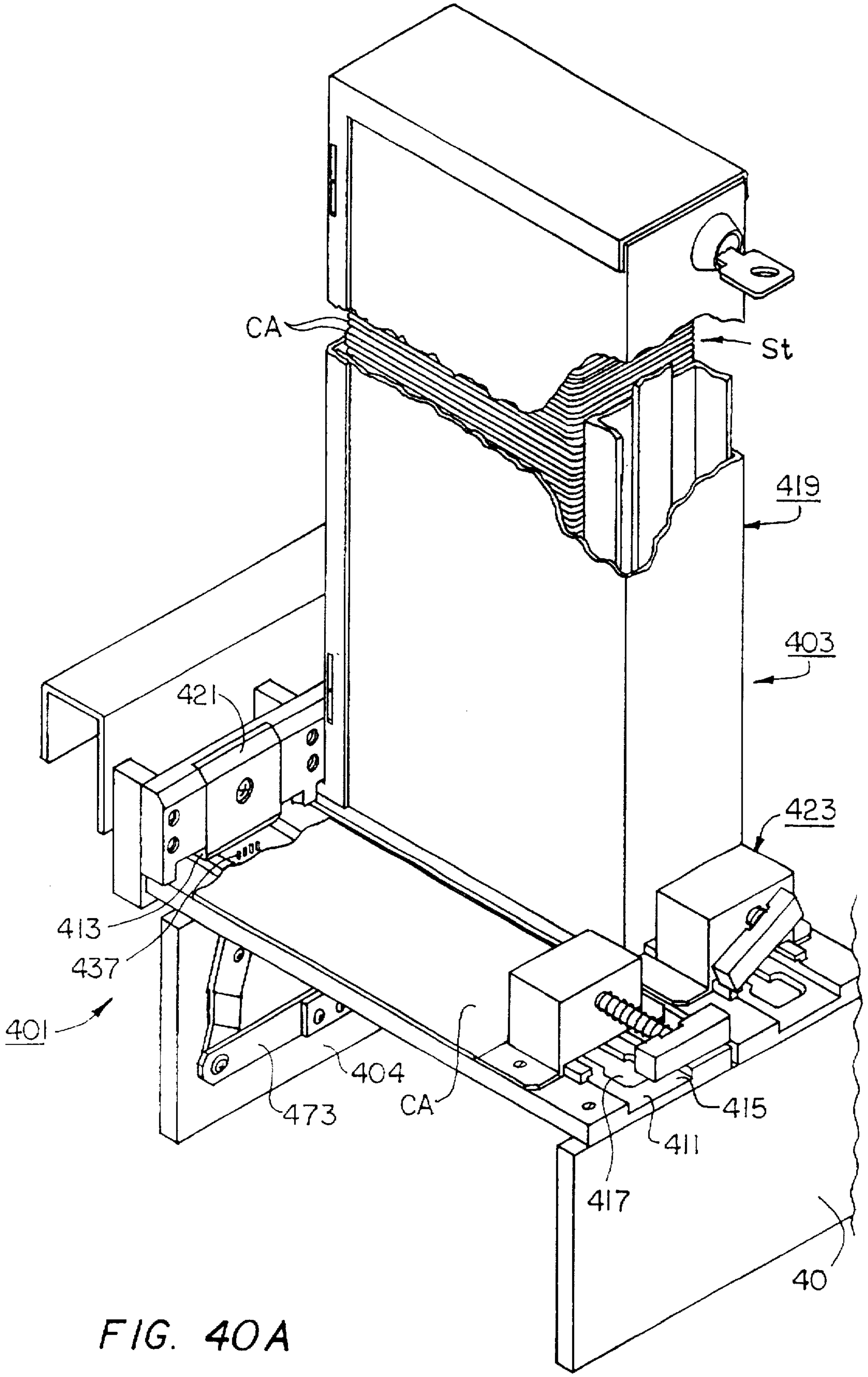
FIG. 40A is a perspective view from the front and partly broken away of the apparatus shown in FIG. 40, the apparatus being shown with a card positioned on top of a read/write assembly, the card being shown partly broken away.

Referring now to FIG. 40, there is shown a fragmentary view partly broken away of another modification of article dispensing module 31 constructed according to this invention the modification of being identified by reference numeral 401. Portions of article dispensing 401 not pertinent to the invention are not shown. Views of portions of module 401 are also shown in FIGS. 41 through 47.

Article dispensing module 401 is intended to be used in dispensing cards having an integrated circuit chip onto which information may be written into and/or read off.

Article dispensing module 401 includes four article dispensing assemblies 403 which are identical to article dispensing assemblies 203, only one assembly 403 and a portion of another assembly 403 being shown in FIG. 40 for illustrative purposes. Article dispensing assemblies 403 are mounted on a pair of vertical support plates 404 and 405, identical to vertical support plates 204 and 205 and secured thereto by bolts 407. Article dispensing module 401 also includes exit rollers mounted on shafts and coupled by a belt to a drive motor (all not shown) identical to the arrangement shown in FIG. 6.

Each article dispensing assembly 403 includes a generally rectangular base 409 similar to base 209 and having a front end 411, a rear end 413 and a longitudinally disposed rectangular recess 415 having a longitudinal opening 417.

Each article dispensing assembly 403 also includes an elongated frame 419, identical to frame 219, for enclosing a plurality of cards CA to be dispensed in a stack St, one on top of the other. Cards CA are of the type which include an integrated circuit chip CH into which information can be written into and read off of, the chips having a plurality of external input and output terminals, a CPU and a memory. Cards CA are disposed in frame 419 with their integrated circuit chips facing down so that they can be electrically contacted by the read/write assemblies described below. For illustrative purposes, only one frame 419 is shown in FIG. 40. Frame 419 is removably mounted on base 409 in the same manner as frame 219 and is removably mounted on base 209.

Each article dispensing assembly 403 further includes a locking mechanism 423 identical in structure and function to locking mechanism 279.

Each article dispensing assembly 403 further includes a transport mechanism 420 identical in structure and function to transport mechanism 220 and a gate 421 identical to gate 221. Transport mechanism 420 is located below frame 419 and gate 421 is located behind frame 419. The purpose of transport mechanism 420 is to transport cards CA from stack St into gate 421.

Each article dispensing assembly 403 further includes a read/write head assembly 425. The purpose of the read/write head assemblies 425 is to read information from the integrated circuit chip on the card CA at the bottom of the stack in its frame and/or write information onto the integrated circuit chip on the card CA at the bottom of the stack in its frame.

Each read/write head assembly 425 includes a read/write head 427 and a guide block 429.

Figure 41:
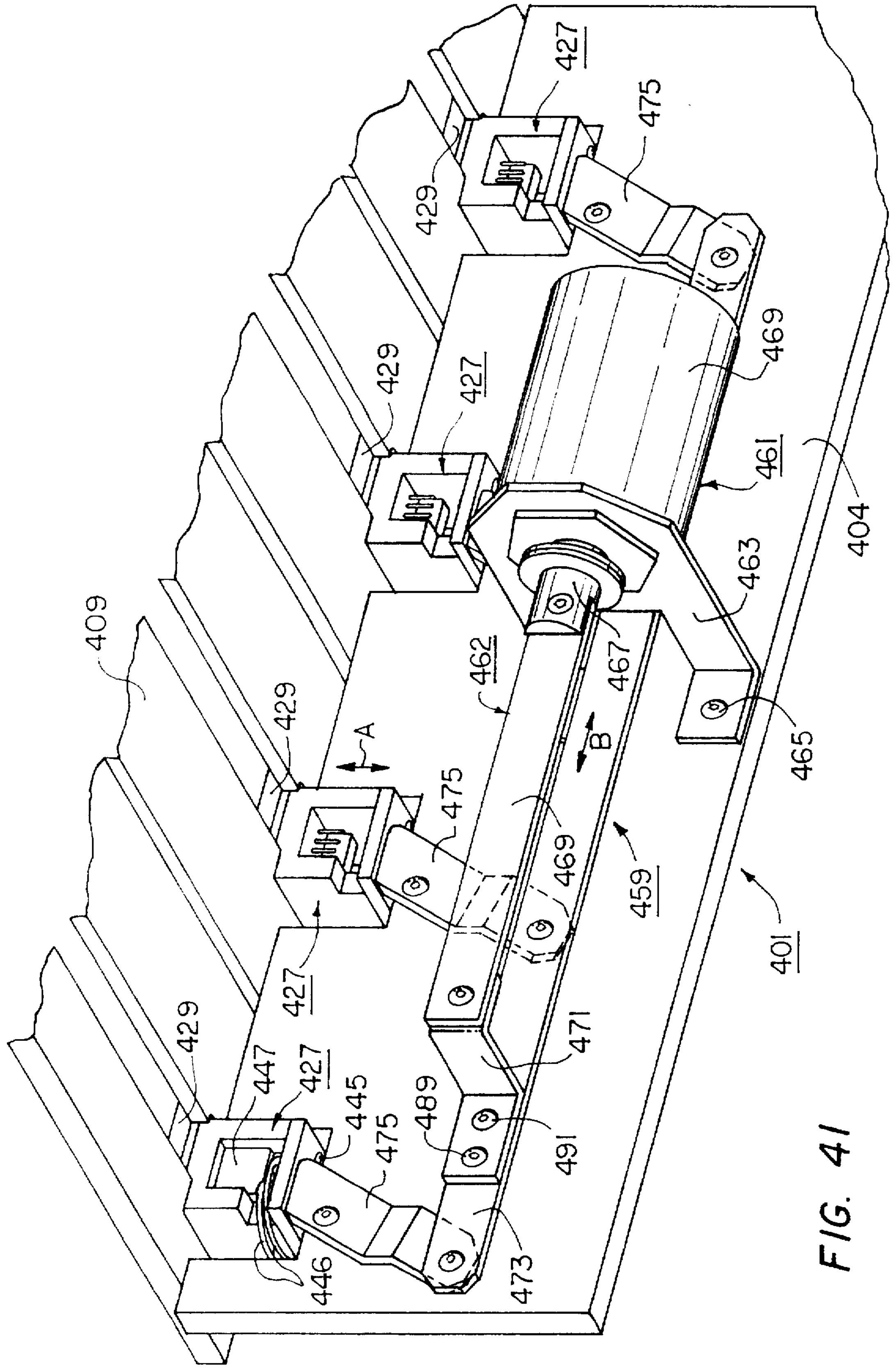
FIG. 41 is an enlarged fragmentary view taken from the bottom of the apparatus shown in FIG. 40.

Read/write head 427 is disposed for vertical up and down movement, as shown by arrows A in FIG. 41, in an opening 431 in base 409 and an opening 433 in support plate 404. Read/write head 427 is movable up and down so that it can be brought into and out of contact with the integrated circuit chip to be written into or read off of. Read/write head 427 includes a pin holding block 435, a plurality of electrical contact pins 437 and a plate 439. Pins 437 are press fit into vertical passageways formed in pin holding block 435 and project out from the top surface 441 of pin holding block 435. Plate 439 is attached to the bottom 443 of holding block 435 by bolts 445. Pins 437 are connected to computer C by wires 446 which are coupled to pins 437 through a connector 447. For illustrative purposes, only one set of wires and its associated connector are shown in the drawings.

Guide block 429 is seated on base 409 above read/write head 427. Pins 437 on block 435 project up into and are slidably movable in vertical channels 449 formed in guide block 429. A spring 451 seated in a recess 453 in pin holding block 435 pushes pin holding block 435 in a downward direction away from guide block 429. Spring 451 is kept in place by a threaded rod 453 which is screwed into guide block 429 and is slidably disposed in recess 453 and passageway 455 in pin holding block 435.

Figure 46:
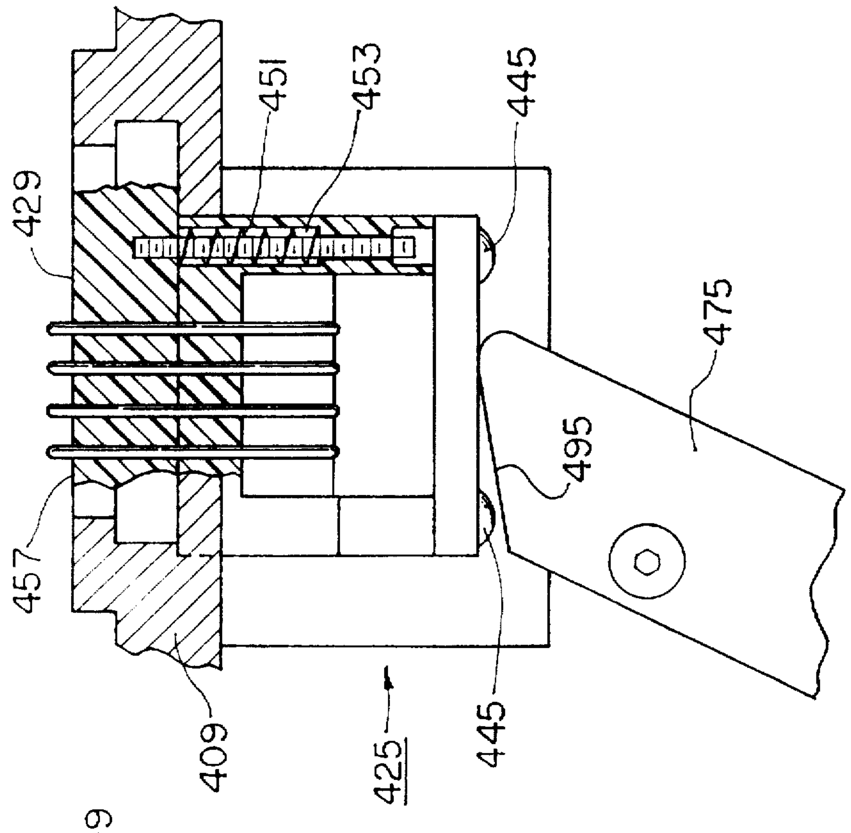
FIG. 46 is an enlarged view partly in section of one of the read/write head assemblies and its associated lever as shown in FIG. 41 with the read/right head in a raised position.
Figure 45:
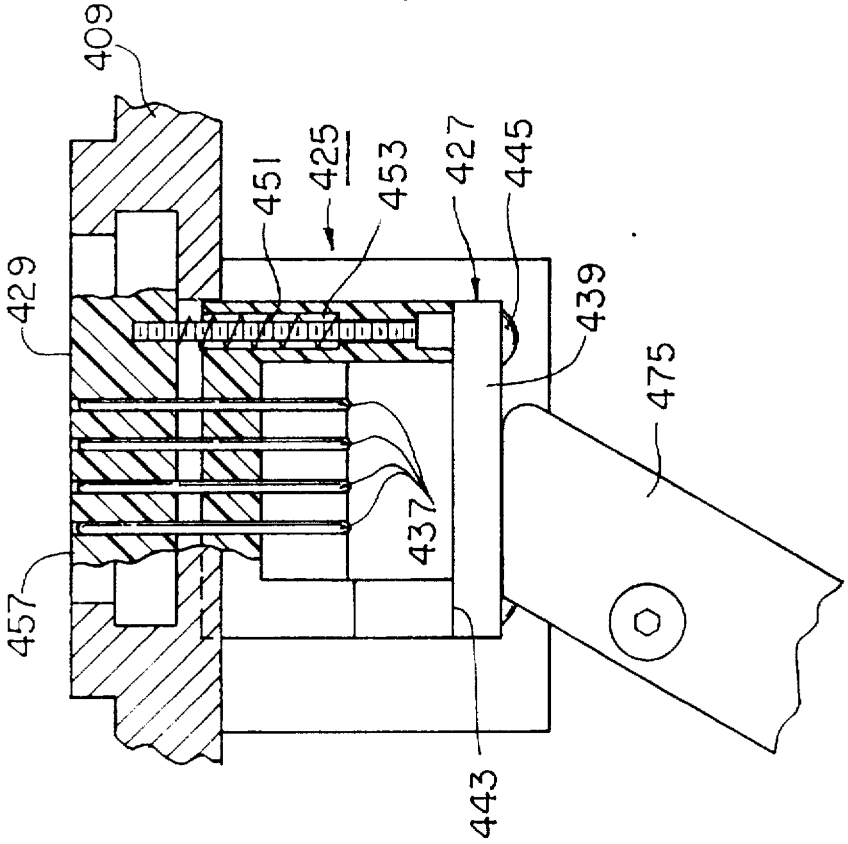
FIG. 45 is an enlarged view partly in section of one of the read/write head assemblies and its associated lever as shown in FIG. 41 with the read/write head in a lowered position.
Figure 45A:
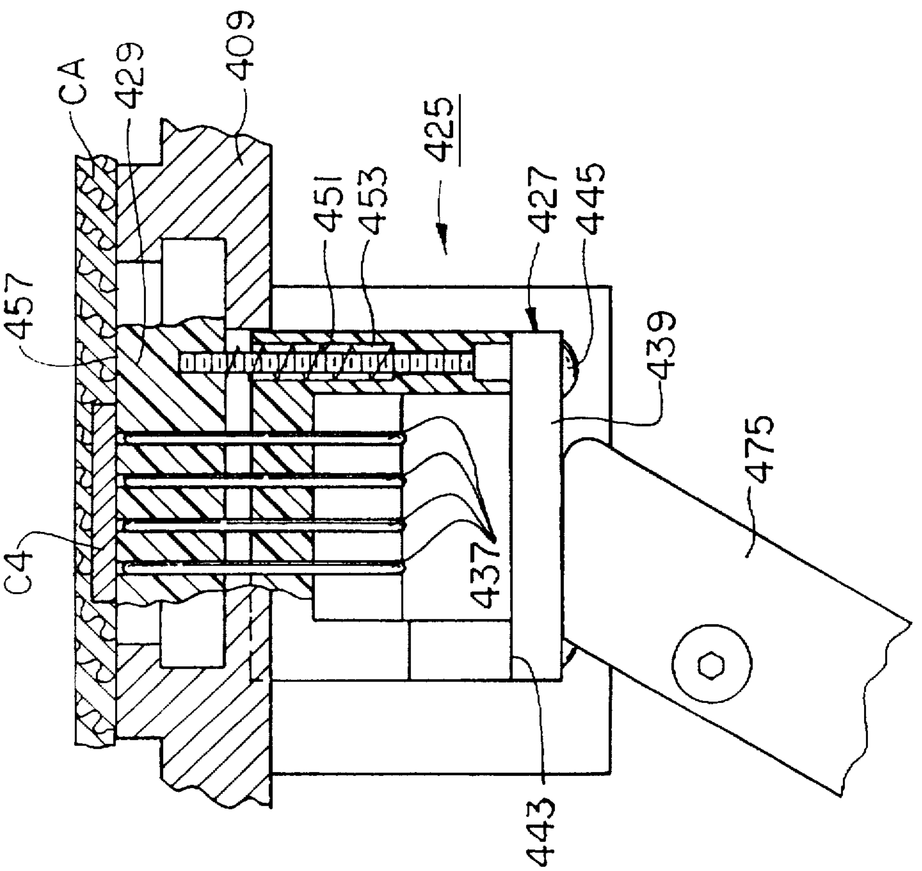
FIG. 45A is an enlarged view partly in section of the read/write head assembly and its associated lever shown in FIG. 45, the apparatus being shown with a card having an integrated circuit chip positioned on the read/write head assembly, the card being shown in section and partly broken away.

When pin holding block 435 is in a down position, as shown in FIG. 45, pins 437 extend up into but not completely through channels 449. On the other hand, when pin holding block 435 is in a raised position, as shown in FIG. 46, pins 437 project up beyond the top surface 457 of guide block 429 so that they can contact the input/output terminals of the integrated circuit chip on the card CA to be read off of and/or written into.

Read/write head assembly 425 is positioned on base 409 such that pins 437 are aligned with the input/output terminals on the integrated circuit chip.

Article dispensing module 401 further includes a mechanism 459 for moving read/write head 427 up and down so that pins 437 can be brought into and out of contact with the integrated circuit chip on the card to be read off of or written into.

Mechanism 459 includes a solenoid 461 and a mechanical linkage assembly 462.

Figure 42:
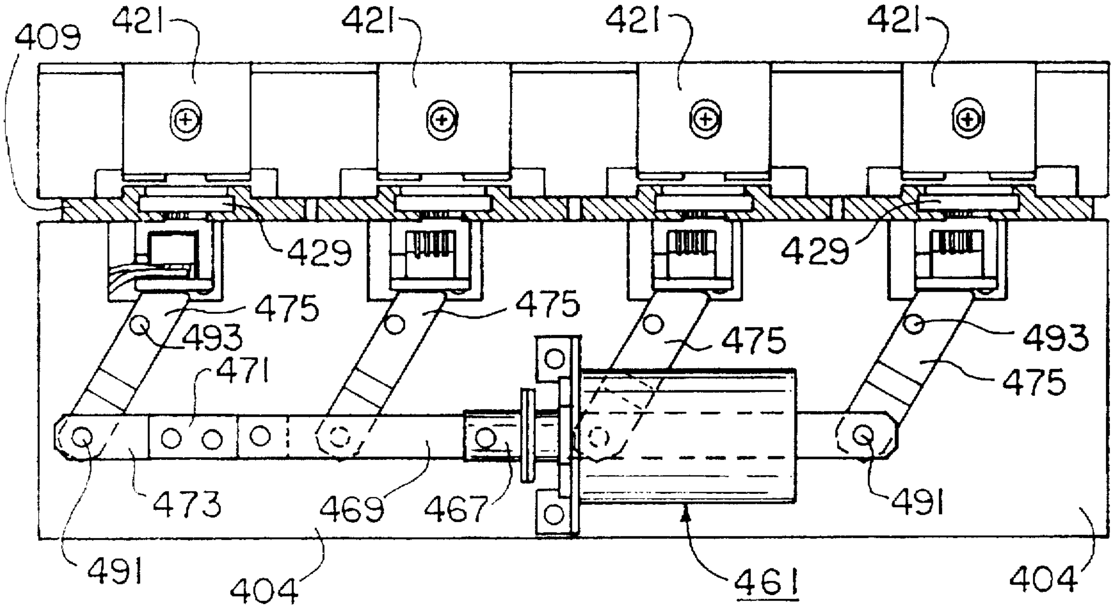
FIG. 42 is a front elevation view partly in section of the portion of the apparatus shown in FIG. 41 with the read/write heads in a lowered position.
Figure 43:
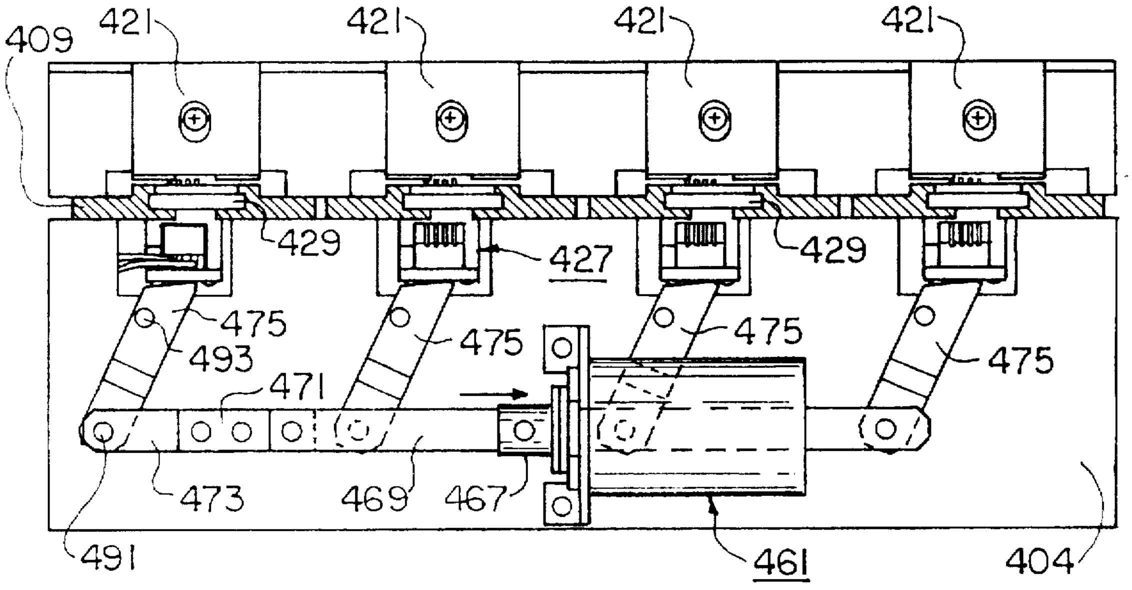
FIG. 43 is a front elevation view partly in section of the portion of the apparatus shown in FIG. 41 with the read/write heads in a raised position.
Figure 44:
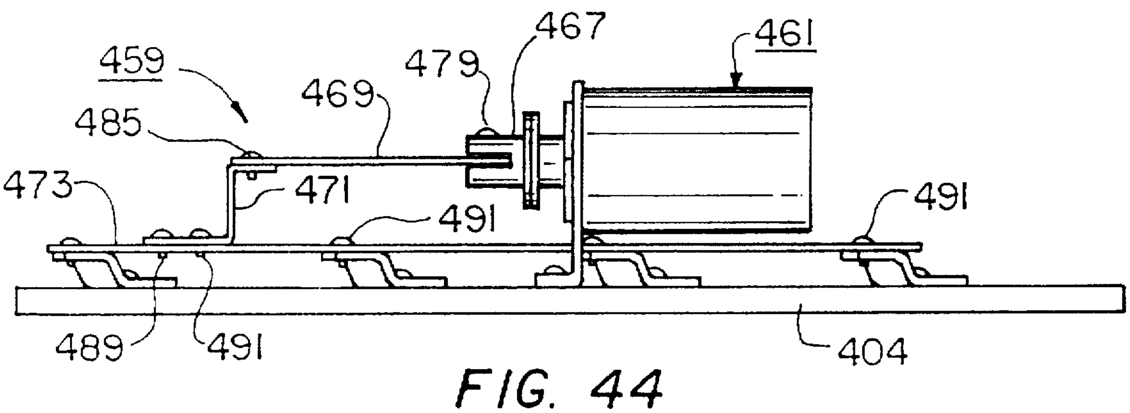
FIG. 44 is a top view of the solenoid and linkage shown in FIG. 41.
Figure 47:
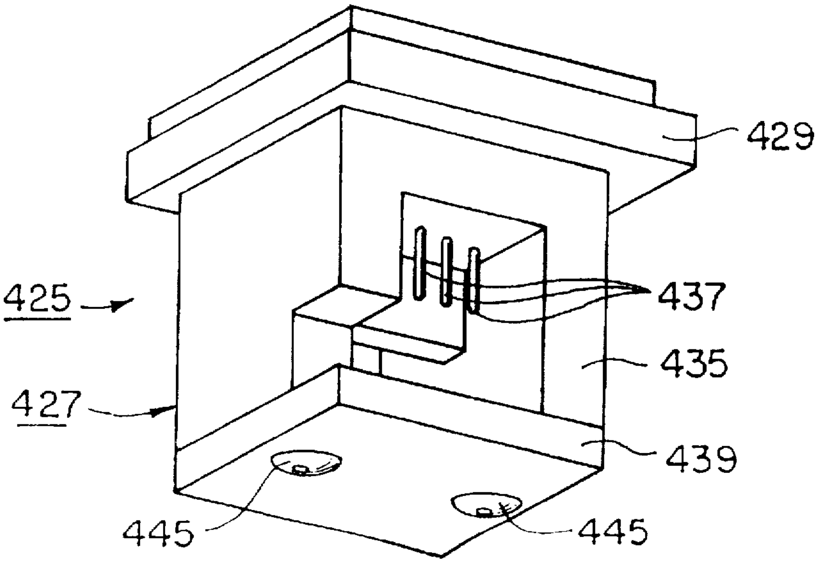
FIG. 47 is an enlarged perspective view of one of the read/write heads shown in FIG. 41.

Solenoid 461 is fixedly mounted on support plate 404 by a bracket 463 and bolt 465. Solenoid 461 is connected by wires (not shown) to computer C which controls its operation. Solenoid 461 includes a plunger 467 which is movable back and forth in housing 469 in the direction shown by arrows B in FIG. 41. When solenoid 461 is deenergized, plunger 467 is in an extended position as shown in FIG. 42. When solenoid is energized plunger 467 moves to a retracted position as shown in FIG. 43.

Mechanical linkage assembly 462 includes a first bar 469, a second bar 471, a third bar 473 and a plurality of levers 475, one lever 475 for each read/write head assembly 425.

First bar 469, is an elongated straight member, is fixedly mounted at one end 477 on plunger 467 by a bolt 479 and nut (not shown). The other end 481 of first bar 469 is fixedly by a bolt 485 and nut (not shown) on one end 483 of second bar 471, which is Z shaped. The other end 487 of second bar 471 is mounted onto third bar 473 by a pair of bolts 489 and 491 and nuts (not shown). Third bar 473 is an elongated straight member. Levers 475 are pivotally mounted at their bottom ends 489 onto third bar 473 by pivot pins 491, each lever 475 being positioned for interaction with one read/write head 427. Levers 475 are also pivotally mounted at a mid location onto support plate 404 by pivot pins 493. The top ends 495 of levers 475 are angled and in contact with plates 439.

As can be seen, when solenoid 461 is deenergized, the top end 495 of lever 475 is flush with bottom surface 497 of plate 439 as shown in FIGS. 42 and 45 and the read/write heads are in a lowered position. On the other had when solenoid 461 is energized, plunger 467 is moved inward in housing 469 causing levers 475 to pivotally move to a position as shown in FIGS. 43 and 46. This, in turn, moves read/write heads to a raised position, as is also shown in FIGS. 43 and 46.

In operation of module 401, read/write head 427 is moved up when information is to be written onto or read off of a card and moved down when the information has been read off of or written into the cars so that the card can be moved without being damaged or scratched by the pins.

The embodiments shown of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. Apparatus for dispensing cards, said cards being of the type which include an integrated circuit chip onto which information can be written into and read off of, said apparatus comprising:

a. a base, b. a frame on said base, said frame enclosing a plurality of said cards to be dispensed in a stack, c. a gate for receiving cards from said frame and allowing only one card at a time to pass through, d. a transport mechanism for transporting said cards from said frame to said gate, and e. a read/write head assembly for reading information off of said integrated circuit chip on said card at the bottom of said stack and/or writing information into said integrated circuit chip on said card at the bottom of said stack, f. said read/write head assembly including a read/write head, said read/write head including a pin holding block and a plurality of contact pins, said read/write head being located underneath said frame and being movable up and down so as to bring said plurality of contact pins into and out of contact with said integrated circuit chip.

2. The apparatus of claim 1 wherein said read/write head assembly includes a read/write head movable up and down, and having a plurality of contact pins.

3. The apparatus of claim 2 and further including a solenoid for moving said read/write head up and down.

4. The apparatus of claim 3 and further including a linkage assembly for mechanically coupling said solenoid to said read/write head.

5. The apparatus of claim 4 wherein said linkage assembly includes a first bar, a second bar, a third bar and a lever.

* * * * *